United States Patent
Flynn

(10) Patent No.: US 9,785,652 B2
(45) Date of Patent: Oct. 10, 2017

(54) METHOD AND SYSTEM FOR ENHANCING SEARCH RESULTS

(71) Applicant: Michael Flynn, Newtown, PA (US)

(72) Inventor: Michael Flynn, Newtown, PA (US)

( * ) Notice: Subject to any disclaimer, the term of this patent is extended or adjusted under 35 U.S.C. 154(b) by 0 days.

(21) Appl. No.: 14/882,875

(22) Filed: Oct. 14, 2015

(65) Prior Publication Data

US 2016/0321302 A1     Nov. 3, 2016

Related U.S. Application Data

(63) Continuation-in-part of application No. 14/701,509, filed on Apr. 30, 2015.

(51) Int. Cl.
| | | |
|---|---|---|
| H04W 24/00 | (2009.01) | |
| G06F 17/30 | (2006.01) | |
| H04W 4/02 | (2009.01) | |
| G06F 3/0488 | (2013.01) | |
| G06F 3/0481 | (2013.01) | |
| G06F 21/62 | (2013.01) | |
| G06Q 30/02 | (2012.01) | |
| H04W 4/20 | (2009.01) | |

(52) U.S. Cl.
CPC ...... *G06F 17/30259* (2013.01); *G06F 3/0488* (2013.01); *G06F 3/04817* (2013.01); *G06F 17/30241* (2013.01); *G06F 17/30528* (2013.01); *G06F 17/30554* (2013.01); *G06F 17/30864* (2013.01); *G06F 17/30867* (2013.01); *G06F 21/6227* (2013.01); *G06Q 30/02* (2013.01); *H04W 4/021* (2013.01); *H04W 4/025* (2013.01); *H04W 4/206* (2013.01)

(58) Field of Classification Search
CPC .................................................. G06F 17/30864
USPC ............. 455/457, 556.1, 466; 382/154, 216; 705/14.55, 14.44, 37, 14.66; 348/143
See application file for complete search history.

(56) References Cited

U.S. PATENT DOCUMENTS

| | | | | |
|---|---|---|---|---|
| 2008/0268876 A1* | 10/2008 | Gelfand | ................. | G06Q 30/02 455/457 |
| 2010/0310182 A1* | 12/2010 | Kroepfl | .............. | G06K 9/00624 382/216 |
| 2012/0005238 A1* | 1/2012 | Jebara | .................... | G06Q 10/04 707/798 |

* cited by examiner

*Primary Examiner* — Kiet Doan
(74) *Attorney, Agent, or Firm* — IP Works, PLLC; Wayne Carroll

(57) ABSTRACT

A computer-implemented method and system is disclosed for providing enhanced context information on a mobile communication device. The method may include correlating visual information to search results from a preference based search query, and transmitting to the mobile communication device, by a content server, a response to the preference based search query with multiple matches. One or more of the multiple matches may be tagged as preferred based on user brand preferences. The response may include location information correlated to the multiple matches. The response may include visual information correlated to the multiple matches.

12 Claims, 31 Drawing Sheets

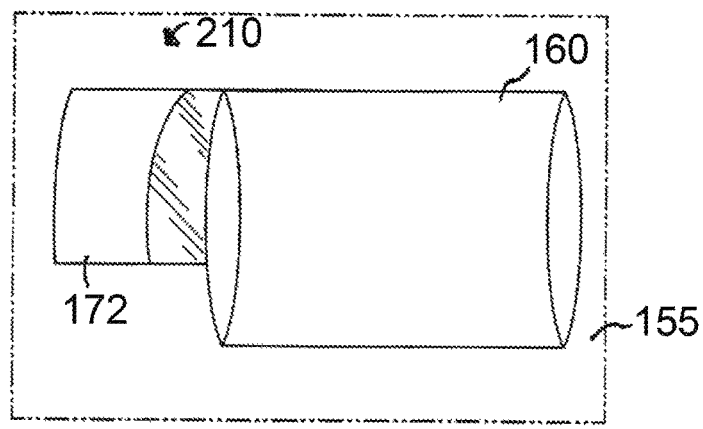
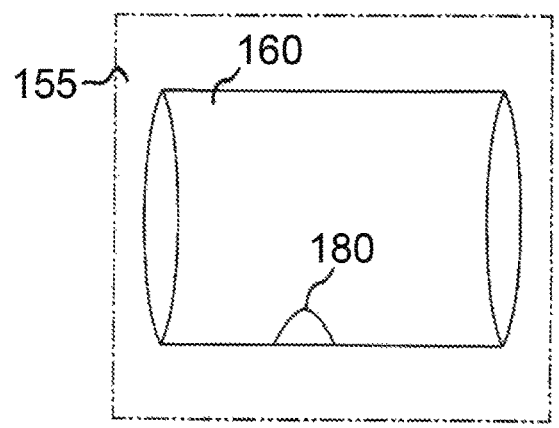
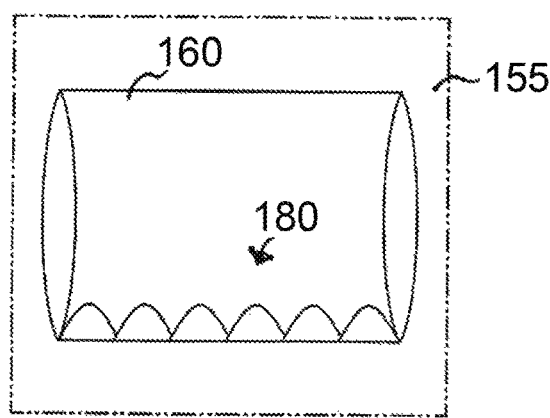

METHOD AND SYSTEM FOR ENHANCING SEARCH RESULTS

CLAIM OF PRIORITY UNDER 35 U.S.C. §§119(e)

This application is a continuation-in-part of U.S. non-provisional application Ser. No. 14/701,509 titled "Mobile Computing System with User Preferred Interactive Components" filed Apr. 30, 2015.

FIELD OF THE INVENTION

The present invention is directed generally to computing environments and more particularly to a mobile computing system having user preferred interactive components.

BACKGROUND

Consumers increasingly seek information and shop via mobile devices. Online browsing can be done at any time and at any place without restriction. Users seek information that is specifically tailored to their needs and that they can personalize. In addition, instant access to information is a critical tool in the current global social climate and business environment. Interactive communication in a user-friendly format and highly available access to and dissemination of information represents a competitive advantage. Instant online communication creates valuable opportunity.

The current state of technology focuses on devices that use a variety of user interfaces to disseminate and display information. Computers, cell phones, tablets, MP3 players, other mobile devices, and other electronic devices use graphical user interfaces having a display screen to convey certain data.

In addition the widespread use of satellite and global positioning devices (GPS) can be utilized by the mobile devices to locate hotels, restaurants, gas stations, stores and other places.

SUMMARY

A computer-implemented method and system is disclosed for providing enhanced context information on a mobile communication device. The method may include correlating visual information to search results from a preference based search query, and transmitting to the mobile communication device, by a content server, a response to the preference based search query with multiple matches. One or more of the multiple matches may be tagged as preferred based on user brand preferences. The response may include location information correlated to the multiple matches. The response may include visual information correlated to the multiple matches.

In some embodiments the preference based search query may include a present location of the mobile communication device. The method may also include transmitting to the mobile communication device, by the content server, an updated response to the preference based search query. The updated response may be based on an updated present location of the mobile communication device.

In some embodiments the response may include deal information correlated with one or more of the multiple matches of the preference based search query. The deal information may include first deals stored in the content server and second deals received from a second server. The second deals may be associated with a location. The preference based search query may include a present location of the mobile communication device. The method may include transmitting to the mobile communication device, by the content server, an updated response to the preference based search query. The updated response may be based on an updated present location of the mobile communication device. The updated response may include updated second deals.

In some embodiments the response to the preference based query may include advertisement information correlated with the multiple matches. The response may include brand information that is correlated to one or more of the multiple matches.

The preference based search query may include a distance radius, and the multiple matches that are tagged as preferred may be within the distance radius. The preference based search query may include a direction of travel. The multiple matches may be within a deviation from the direction of travel. The deviation may be between about fifteen degrees and ninety degrees from the direction of travel. The deviation may be about forty-five degrees.

In some embodiments the visual information may include brand images correlated with the multiple matches. The visual information may include offer status correlated with the multiple matches. The response to the preference based search query may include instructions to display the visual information as one of multiple colors.

BRIEF DESCRIPTION OF THE DRAWINGS

FIG. 8 is a front elevation view of an embodiment of the portion of the communications terminal display screen showing the three-dimensional pillow-shaped icon with a partial three-dimensional pop-out on the left side;

FIG. 9 is a front elevation view of an embodiment of the portion of the communications terminal display screen showing the three-dimensional pillow-shaped icon with a single triangular-shaped button;

FIG. 10 is a front elevation view of an embodiment of the portion of the communications terminal display screen showing the three-dimensional pillow-shaped icon with a row of triangular-shaped buttons;

DETAILED DESCRIPTION

Figure 1:
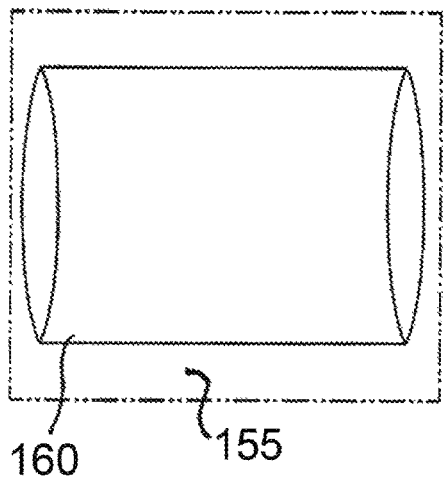
FIG. 1 is a front elevation view of a portion of a communications terminal display screen showing a three-dimensional pillow shaped icon.

The present invention references a mobile device. As generally understood a mobile device can be a computer that includes one or more processor and can include or be in processing communication with a display and user interface device. A mobile device can include a variety of apparatus, including but not limited to mobile phones and mobile tablets among others.

For a general understanding of the invention, reference is made to the drawings, FIGS. 1 through 22 herein. The matter shown in phantom, or dotted lines, illustrates environmental structure and forms no part of the claimed design. Reference numerals are used to designate elements as defined and described below. The present invention will be described by way of example and not limitation. Modifications, improvements and additions to the invention described may be determined after reading this specification and viewing the accompanying drawings; such modifications, improvements, and additions being considered included in the spirit and broad scope of the present invention and its various embodiments described or envisioned herein.

FIG. 1 provides an embodiment showing a front elevation view of a portion of a communications terminal display screen 155 of a graphical user interface showing a three-dimensional pillow shaped icon 160. The "glow", as used herein, may represent certain information that a merchant wishes to communicate to the user. Communication using a glow may be through images, sounds, colors, patterns or vibrations. In some embodiments the glow may provide a user with a threshold of information, such as approximate distance, the presence of an offer of a deal that is available, or an image associated with a brand or store. In some embodiments a glow may indicate an update of information including a sports score or result, a travel update such as change in the status or schedule for an airplane flight, and update on a website, or other information updates that a user may be interested in. The glow may provide information or may capture attention to communicate information. In some embodiments the glow is a portion of an icon or image. In some embodiments the glow is a portion of a display on a screen, such as a border, or a portion of a border of a screen.

As used herein, graphical user interface (GUI) is commonly known as a type of user interface that allows a user to interact with an electronic device through graphical icons and visual indicators such as secondary notation, position, indentation, color and symmetry. The actions in GUI are usually performed through direct manipulation of the graphical elements by the user. The GUI may be a touch screen display that may be manipulated by movement of the finger of the user or by a stylus or by manipulation of a cursor, such as an electronic mouse. In certain instances, manipulation can be accomplished by either depressing or clicking on the icon and also by hovering the finger, cursor or stylus over the icon. As referred to herein, reference to manipulating the icon may be accomplished by any of the mechanisms listed herein or other known or later developed methods of manipulating a visual element. Reference to manipulating the icon may be used interchangeably with manipulation of the GUI and includes any other means for manipulation of the GUI.

In many instances, users prefer and are enabled to access the data by clicking or selecting on one or more icons provided on a display screen of a computer or mobile device. Icons may enable the user to proceed to the information they need. An object of some embodiments is to covey as much necessary information as possible to the user in as little amount of space as possible.

According to some embodiments, the icons 160 can be used with any GUI including computer monitors, tablets, cell phones, e-readers, hand-held devices such as MP3 players, portable media players, gaming devices, household appliances, office and industry equipment display terminals or any other devices that use a graphical interface to convey information or interact with the user. The GUI useful herein may include two-dimensional display screens. The display screen of the GUI can have any suitable interface resolution.

The "icon" 160 as used herein may include a component of a graphical menu that is displayed on the screen and is visually distinguishable from the background of the display screen 155. The icons 160 of some embodiments can be located or arranged in any manner on the display screen 155 of the GUI, and are not limited to any particular arrangement, grid, or matrix. Any number of icons 160 may be present on the display screen while maintaining useable screen space. The number of icons is limited only by the size of the device 100 with respect to the amount of available user screen space and the size of the icons 160.

In addition, as used herein, by "icon owner" may include the entity that is being represented by a particular icon, for example, a company of any type, merchant, advertiser, brand, magazine, entertainment or news service, and any other entity whatsoever. Icons 160 may incorporate the name and logo of a merchant.

In some embodiments an icon 160 can be used to communicate information to the observer or user by displaying information in a manner disclosed herein. In some embodiments, information is displayed or expressed by the icon 160 "glowing" in order to indicate that certain information is intended to be communicated. As used herein, the term "glow" 210 refers to giving off of light or radiance that emanates from the icon 160 and is visually ascertainable and distinguishable on the display screen 155 of the device 100. In addition, the "glow" 210 as used herein, may refer to various illustrative effects that emanate from the icon, such as those illustrated in FIGS. 14 through 17. In further embodiments, the glow may be configured to various shapes, such as, but not limited to a splash 220, illustrated in FIG. 14, a star 222, illustrated in FIG. 15; bubbles 224, illustrated in FIG. 16, and a sun 226, illustrated in FIG. 17. The term "glow" 210 as used herein, may also incorporate pop-out design 170. The invention is not limited to the shapes or pictorial effects illustrated by the drawings, and may include any other shapes or pictorial effects that may be pleasing to users or icon owners. Variation in different glow 210 types may allow different icon owners, merchants, for example, to distinguish their brands and the "look and feel" of their icons.

In some embodiments a brand owner may customize the glow for offers related to their brand. A brand owner may upload or associate an image file that may be used as part of the glow. For example the bubbles 224 in FIG. 16 may be replaced by an image of a brand logo or other branding item. In some embodiments a brand owner may upload a small image file, including a favicon file, to be used as a moving image or glow. In some embodiments a brand owner may upload an image file that has colors, patterns or shapes that the brand owner desires to be associated with their brand, to be used as moving images for at least part of the glow.

Figure 2:
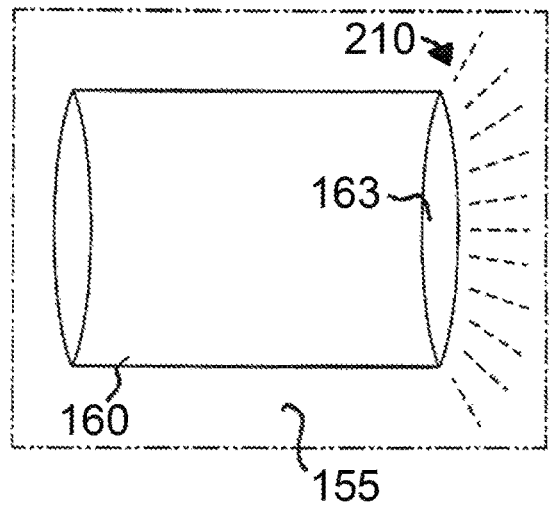
FIG. 2 is a front elevation view of an embodiment of the portion of the communications terminal display screen showing the three-dimensional pillow-shaped icon with a right side glow.
Figure 3:
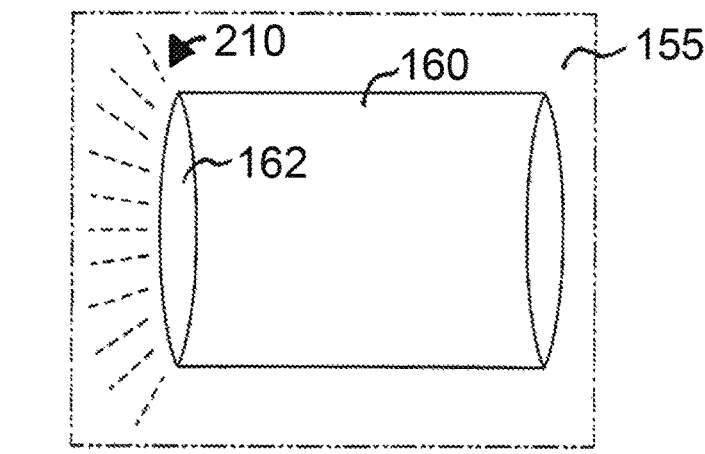
FIG. 3 is a front elevation view of an embodiment of the portion of the communications terminal display screen showing the three-dimensional pillow-shaped icon with a left side glow.
Figure 4:
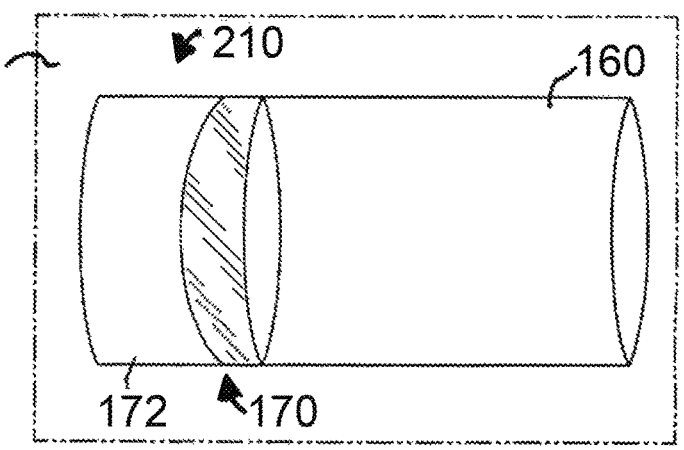
FIG. 4 is a front elevation view of an embodiment of the portion of the communications terminal display screen showing the three-dimensional pillow-shaped icon with a three-dimensional pop-out on the left side.
Figure 5:
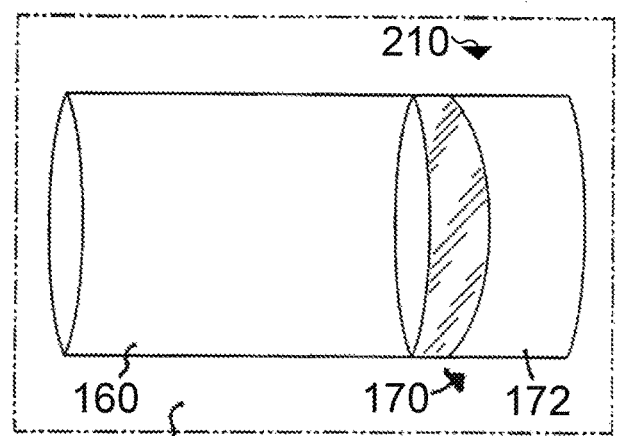
FIG. 5 is a front elevation view of an embodiment of the portion of the communications terminal display screen showing the three-dimensional pillow-shaped icon with a three-dimensional pop-out on the right side.
Figure 6:
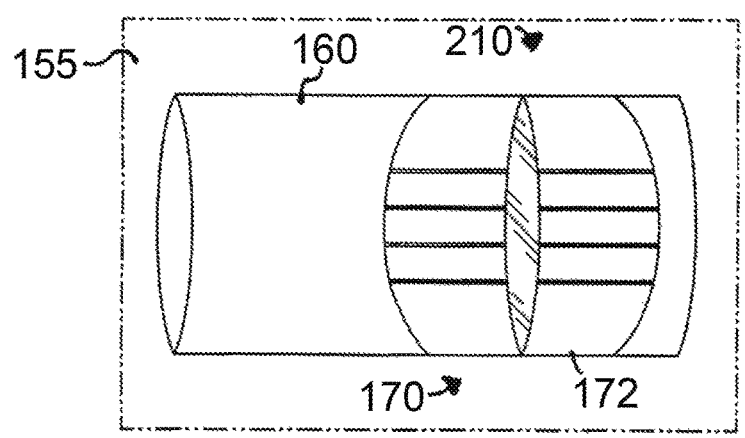
FIG. 6 is a front elevation view of an embodiment of the portion of the communications terminal display screen showing the three-dimensional pillow-shaped icon with a three-dimensional pop-out featuring a multi-button menu on the right side.
Figure 7:
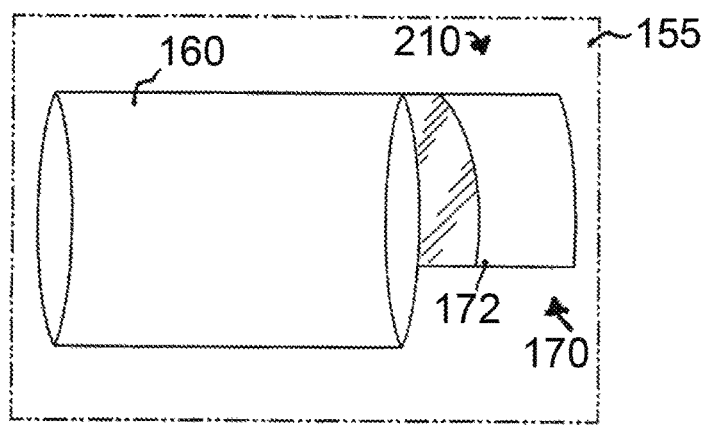
FIG. 7 is a front elevation view of an embodiment of the portion of the communications terminal display screen showing the three-dimensional pillow-shaped icon with a partial three-dimensional pop-out on the right side.

In some embodiments either the entire icon 160 may glow 210 or only segments or portions of the icon 160 may glow 210 according to various embodiments. FIG. 2 illustrates an embodiment where the left side 163 of the icon 160 is glowing as the icon 160 is located on the display screen 155 having orientation, and FIG. 3 is an embodiment where the right side 162 of the icon is glowing, or the opposite side of the icon of FIG. 2. Such arrangements can represent different pieces or categories of information being communicated by the same icon 160. In another embodiment, the icon 160 has pop-outs 170, illustrated in FIGS. 4 through 8, that convey information. When the user clicks on the glowing icon 160, a larger box 172 may appear showing information or further options. In other embodiments, shown in FIGS. 9 and 10, the icon 160 comprises a row of triangular shaped buttons 180.

Figure 11:
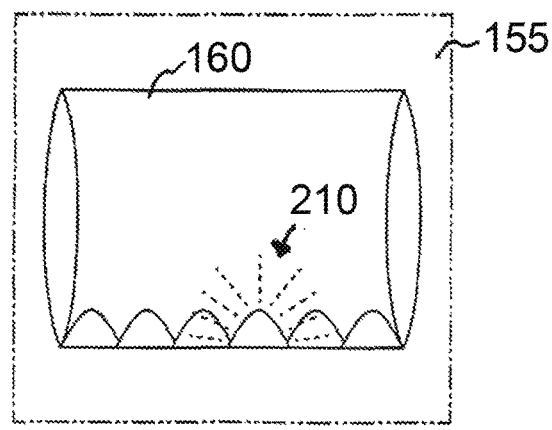
FIG. 11 is a front elevation view of an embodiment of the portion of the communications terminal display screen showing the three-dimensional pillow-shaped icon with a row of triangular-shaped buttons and one triangular-shaped button with a glow.
Figure 12:
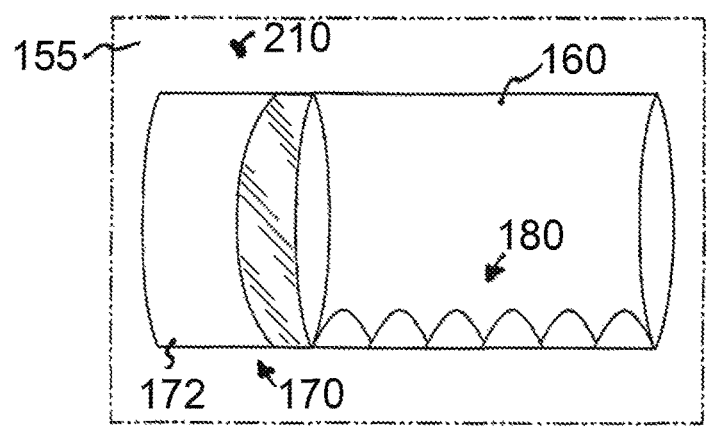
FIG. 12 is a front elevation view of an embodiment of the portion of the communications terminal display screen showing the three-dimensional pillow-shaped icon with a row of triangular-shaped buttons and a three-dimensional pop-out on the left side.
Figure 13:
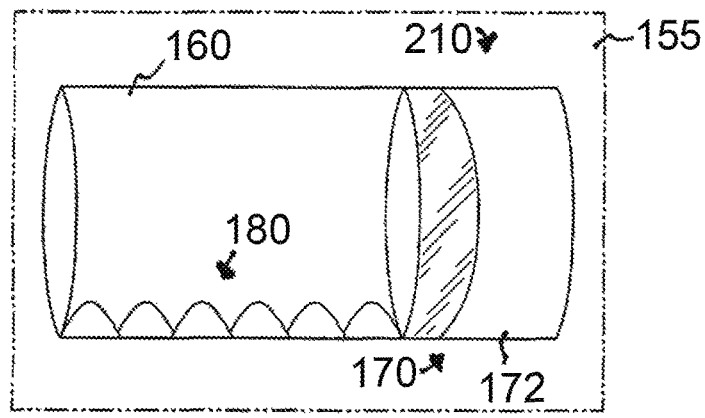
FIG. 13 is a front elevation view of an embodiment of the portion of the communications terminal display screen showing the three-dimensional pillow-shaped icon with a row of triangular-shaped buttons and a three-dimensional pop-out on the right side.
Figure 14:
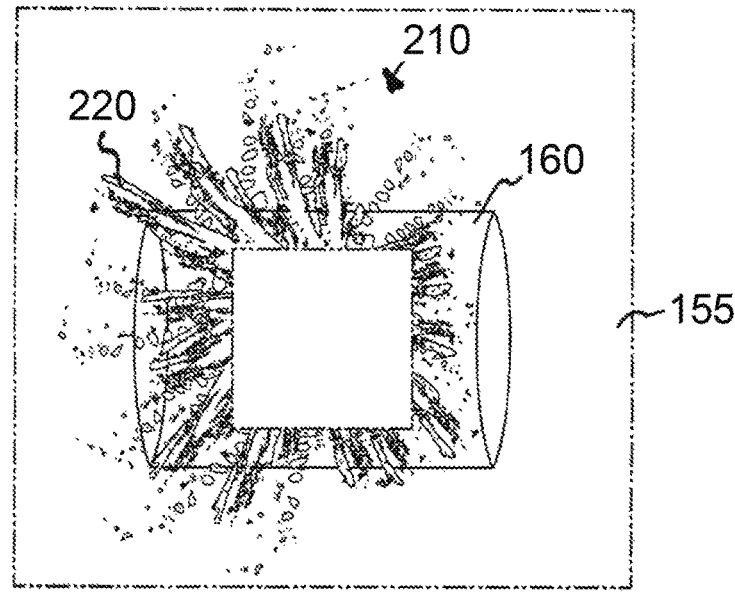
FIG. 14 is a front elevation view of an embodiment of the portion of the communications terminal display screen showing the three-dimensional pillow-shaped icon with a splash glow.
Figure 15:
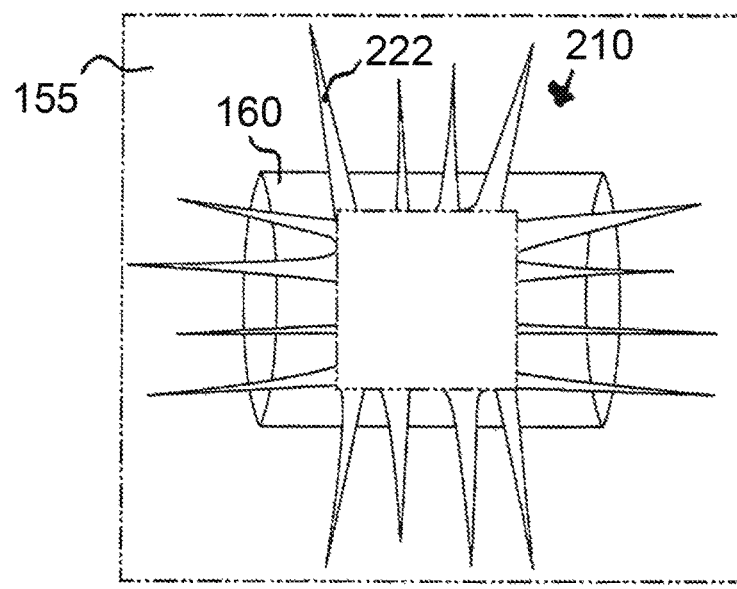
FIG. 15 is a front elevation view of an embodiment of the portion of the communications terminal display screen showing the three-dimensional pillow-shaped icon with a star glow.
Figure 16:
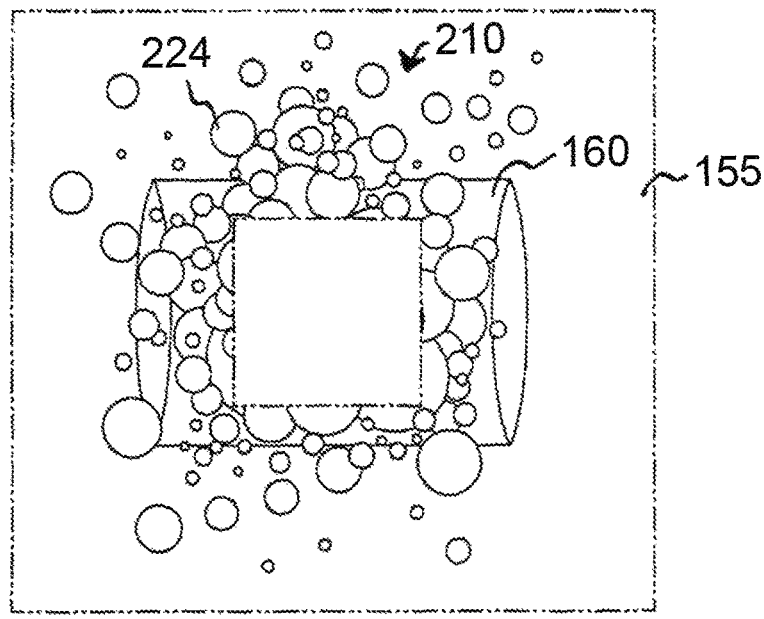
FIG. 16 is a front elevation view of an embodiment of the portion of the communications terminal display screen showing the three-dimensional pillow-shaped icon with a bubble glow.
Figure 17:
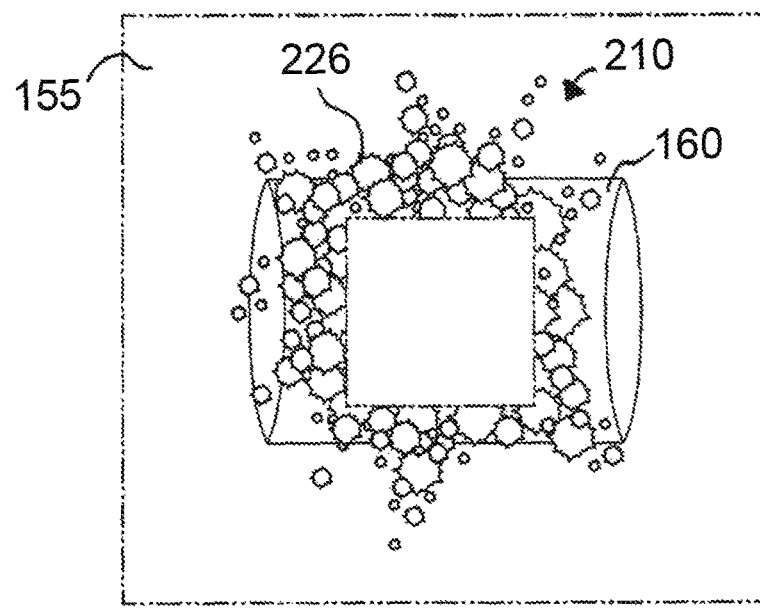
FIG. 17 is a front elevation view of an embodiment of the portion of the communications terminal display screen showing the three-dimensional pillow-shaped icon with a sun glare glow.

The various glow 210 types, such as bubbles 224, pop-out 170 or triangle 180, or any other elements, can be further combined in one icon in order to impart and communicate various categories of information to the user. This is shown in FIGS. 11, 12 and 13.

In some embodiments, selection can be made in a number of ways such as but not limited to hovering a finger, stylus or cursor over any of the icons 160 may trigger a glow 210, indicating that a user can interact with it. Alternatively, an icon 160 with an offer or other feature to communicate may glow 210 without a user hovering.

Information to be conveyed by the icon owner is typically contained on the owner's website, such as a merchant. A particularly useful application of some embodiments is directed toward providing advertising that enhance a personalized shopping experience.

Some embodiments include a voice activated application for use with mobile devices 100 such as a smart phone and tablets. The voice activated component may enable command searches. For example, the user asks the application via voice command for a particular advertiser, store, or other advertiser in the local area. The application may then identify what the user has asked for and display, on the mobile device's screen 155, the logo of the particular advertiser the user requested in his voice command.

In this embodiment, the user can simply tap a logo and the mobile device speaks the address of the advertiser closest to the user. A double-tap on the logo may revert to a program, possibly provided by a third party company that provides directions and maps to the advertiser, store, or manufacturer's location. Voice activation can be used to convey any other command to the system via voice command.

Figure 19:
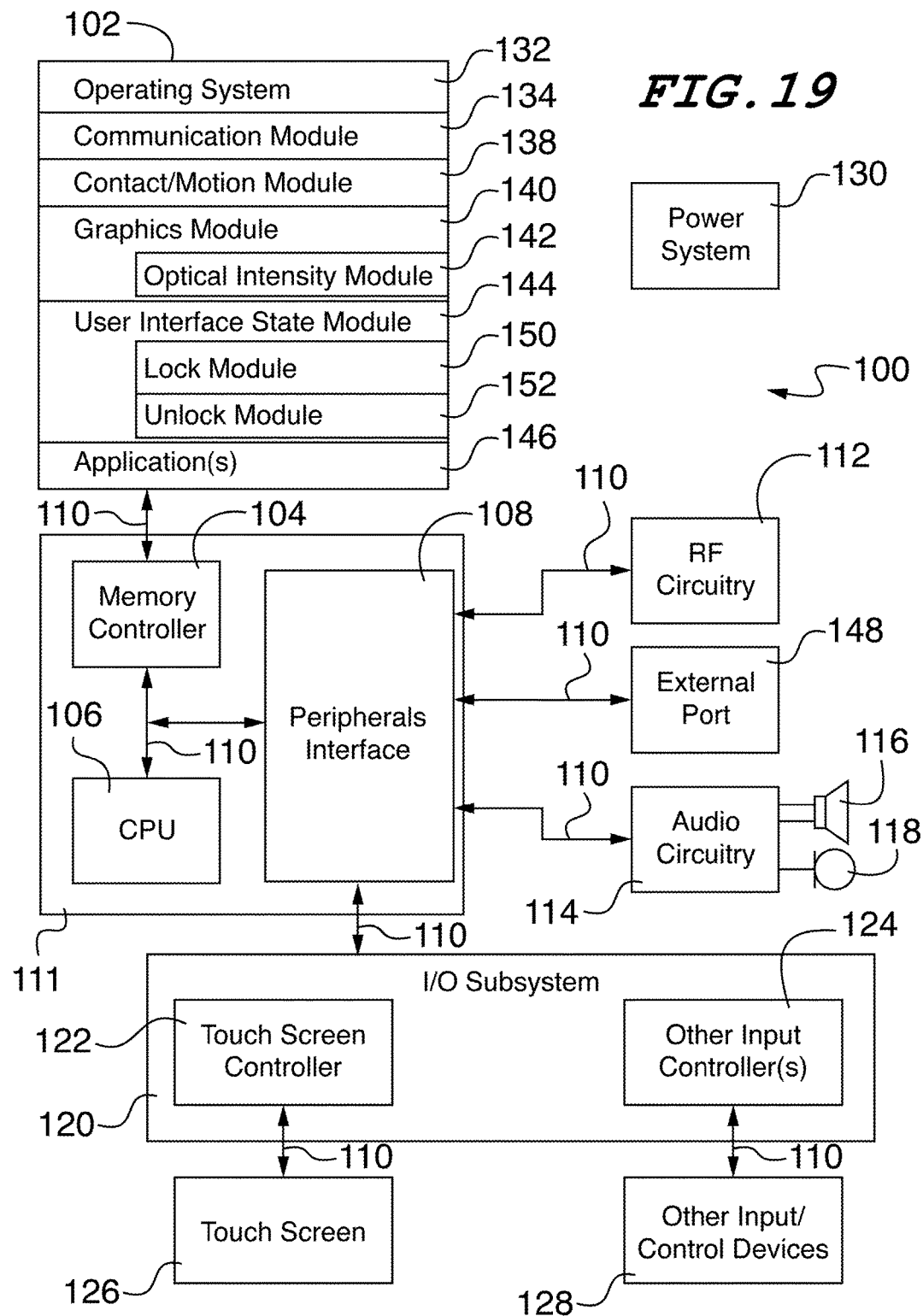
FIG. 19 is a system diagram of an embodiment of a mobile electronic device.

FIG. 19 illustrates an electronic device 100, according to some embodiments. The device 100 may include a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components may communicate over the one or more communication buses or signal lines 110. The device 100 can be any portable electronic device, including but not limited to a handheld computer, a tablet computer, laptop computer, a mobile phone, a digital watch or other "wearables", a media player, a personal digital assistant (PDA), or the like, including a combination of two or more of these items, and one or more of these items may be a hand-held electronic communication device. It should be appreciated that the device 100 is only one example of a hand held electronic communication device 100, and that the device 100 may have more or fewer components than shown, or a different configuration of components. The various components shown in FIG. 19 may be implemented in hardware, software or a combination of both hardware and software, including one or more signal processing or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to and from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet or a wireless network, such as a cellular telephone network, a wireless local area network (LAN) or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email, instant messaging, or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker 116 converts the electrical signal to human-audible sound waves. The audio circuitry 114 also receives electrical signals converted by the microphone 118 from sound waves. The audio circuitry 114 converts the electrical signal to audio data and transmits the audio data to the peripherals interface 108 for processing. Audio data may be retrieved from or transmitted to the memory 102 or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects. The objects shown in FIGS. 1-18, for example may be soft keys or soft buttons for user input.

The touch screen 126 also accepts input from the user based on haptic or tactile contact. The touch screen 126 forms a touch-sensitive surface that accepts user input. The touch screen 126 and the touch-screen controller 122 (along with any associated modules or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch-screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The user may make contact with the touch screen 126 using any suitable object or appendage, such as a stylus, finger, and so forth.

In some embodiments, in addition to the touch screen 126, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 126, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), or an acceleration (including magnitude or direction) of the point of contact. In some embodiments, the contact/motion module 138 and the touch-screen controller 122 also detect contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

The user interface state module 144 controls the user interface state of the device 100. The user interface state module 144 may include a lock module 150 and an unlock module 152. The lock module detects satisfaction of any of one or more conditions to transition the device 100 to a user-interface lock state and to transition the device 100 to the lock state. The unlock module detects satisfaction of any of one or more conditions to transition the device to a user-interface unlock state and to transition the device 100 to the unlock state.

The one or more applications 146 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In some embodiments, the device 100 includes the touch screen 126, the touchpad, a push button for powering the device on/off and locking the device, and a volume adjustment rocker button. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad. The particular embodiments described herein are not meant to limit in any way the scope of the claimed invention.

To aid understanding, one or more examples will now be provided to better illustrate one or more embodiments with the understanding that the operation of the present invention is not limited in scope to these examples alone.

EXAMPLES

Consumers also increasingly shop via mobile devices. Online browsing can be done at any time and at any place without restriction. Some embodiments provide personalization including special deals. For example, a highly personalized online advertising and shopping system may provide online consumers with advertisements through interactive games and other user-directed interactive means, as well as providing them with a fast, efficient way to purchase offered products.

In some embodiments special deals may include categories, for example, hot product may be a category, identified by the fire symbol, and may include a single item determined by an advertiser. For example a "shoe" may be the product about which the user wishes to get more information. When designating hot products, advertisers may have the ability to choose: demographics, regions, number of items sold, day of the week/time limit, automatic rotation of advertiser products, or price. Advertisers may display one or more reasons for hot products, including but not limited to: new products, seasonal, timely, in the news, limited quantity.

The mobile application in some embodiments allows a user of the mobile device on which the app is loaded to ascertain the location of a particular venue, product or service, what deals or sales are associated with that product or service, and how the user can get to such venue or location of the product or service at any given time. The terms "application", "mobile application", "application software" and "app" are used interchangeably herein. The app can be located on any mobile device such as a smartphone, tablet, PDA (personal digital assistant), ultra-mobile PC, smartwatch, Google® Glass or any other device having a display screen and a touch input keyboard or touch screen interface. The mobile device operable with the app in some embodiments contains Wi-Fi, Bluetooth and GPS capabilities. The platform for the operation may be iOS 7 and greater and Android 4.0 and greater, or other suitable platforms.

The mobile application in some embodiments comprises a voice recognition capability that allows the user to speak the name of a desired venue, location, company, brand, or advertiser into the user's phone or other mobile device. Any deals, sales, news, products, or other event pertaining to that product or advertiser may appear on the graphic user interface of the display screen. By speaking to the application, users can locate vendors, ask for directions, or identify sales without having to fumble with their phone or dangerously divert their attention when driving. Further, the mobile application may indicate the relevant information to the user both visually with pop-up boxes 170 and orally via sound capability. If the user travels on public transportation or spends time in a quiet area, the system's highly customizable interface may allow the user to silence the voice playback system.

In some embodiments, the vocal interaction between user and application provides a quick, efficient, and safe means of learning about a new deal, sale, news, product, or other novel information from a particular provider or the user's selected advertiser. When using some embodiments, users may not have to waste time searching in web browsers to find deals for their favorite stores. In some embodiments user may not need to fumble with a phone and tediously dig through menus to discover the latest hot deal.

Figure 20:
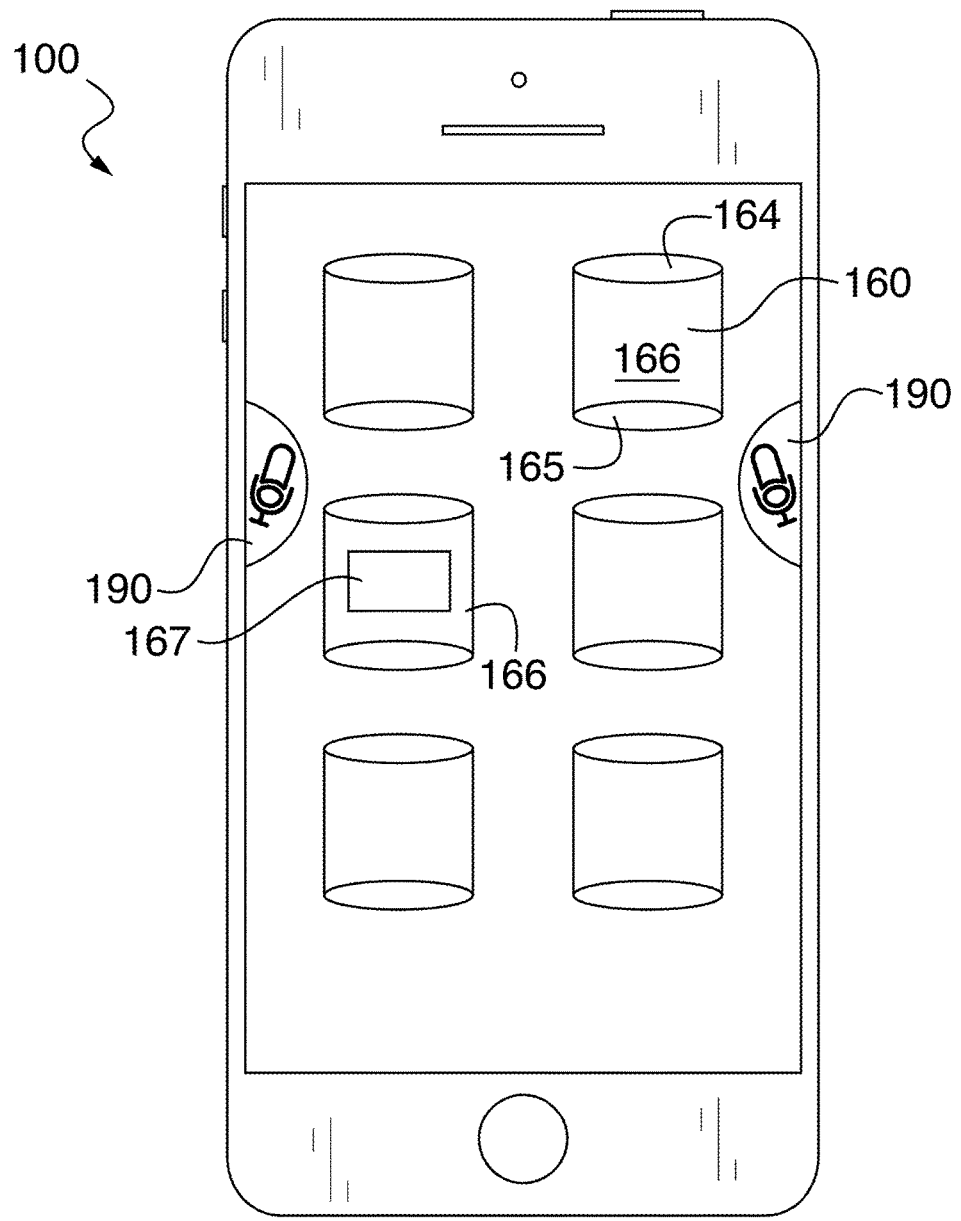
FIG. 20 is an example embodiment with a plurality of icons on a mobile device.

The icon 160 in some embodiments can be any shape or configuration. In some embodiments as designed herein, the icon has a generally pillow-shaped configuration, and may have a three-dimensional shape. FIG. 20 shows an icon 160 in some embodiments having "eye" shaped designs at the top and bottom sides of the rectangular portion of the icon, while other embodiments may have "eyes" at the left and right sides of the rectangular portion of the icon or on all sides of the rectangular portion of the icon.

In some embodiments the eye shaped design and a glow effect may be created by displaying a first shape filled with a color, and displaying in a layered manner, a second shape with a lighter color than the first shape over the first shape. The second shape may have a large shadow radius as the same color as the second shape. In some embodiments a repeat animation may set the second shape's opacity from zero to one (or one-hundred percent) and back to zero continuously. The repeat animation of the opacity may give the illusion that the second shape is glowing. In this example when the opacity of the second shape reaches zero, the first shape is fully visible with the color of the first shape. When the opacity of the second shape reaches one, the second ellipse may be fully visible with the lighter color and the large shadow. The lighter color shadow may produce an effect that the changing color of the shape is affecting surrounding images and making them lighter as well. In some embodiments the first shape and the second shape are an ellipse. The first shape and the second shape may be the same size and shape, and the second shape may have a shadow that is larger than the first shape.

For example, the eye 164 at the top edge of the icon 160 may indicate a limited time offer, and the eye 165 at the bottom edge of the icon 160 may indicate a distance from the location of an advertiser. For example the eye 165 at the bottom edge of the icon 160 may glow a yellow, alerting the user that the advertiser featured on the particular icon has a location within a certain number of miles of the user's current position. By utilizing the mobile device's GPS capability, the application identifies the location of the particular advertiser and shows the distance and directions to that advertiser's location on the display screen. Users can customize the application to determine the search radius to be searched by the application. Further, the app's voice playback capability may speak the directions so that users do not have to handle a phone and look at a display screen while driving.

The information a user can learn from pressing an icon may differ with each company, brand, or advertiser. The type of information provided by a Subway® store may differ for information provided for a McDonald's® store, as an example, or for a brand clothing chain, as another example. The information may depend on the content that a particular merchant wishes to communicate via the app. Some examples of information that can be provided by the app include sales, deals, hot buys, news, products, as well as location to a particular vendor or store. The application alerts the user to this information through pop-out screens 170 and different graphical representations of the icon. Alerts can be delivered in various forms. In some embodiments, different portions of the icon may glow in certain colors depending on the type of information being relayed. This "glow" may indicate to the user that information relevant to the user's interest exists and the user can discover this information by interacting with the icon.

As such, the app may be customized by users to select categories of information of interest, such as a new product launch or a sale, and users may assign different types of glows to indicated different alerts.

Some embodiments can be such that it accounts for physical interaction with the system to obtain advertiser information. When the user travels to an area where voice commands become unavailable, he can perform a finger tap, or series of finger taps, to procure the desired information. For example, when an advertiser's logo appears on the main display screen, the user taps it once. This single tap may lead the application to speak the advertiser's address aloud. The application may then speak turn-by-turn directions to that advertiser's location.

Alternatively, a touch on the icon 160 or voice command 190 may instruct the application to display the advertiser's address in a text box. The app may then open a map in order to instruct travel directions to the user. The user may also set a predetermined default for a preferred map program. When the advertiser's address appears on the text box, the user may perform another touch on the address or voice command, prompting the application to open up the default maps application.

Additional embodiments provide the capability of storing photographs. Typically, photographs of a vendor can be displayed next to a vendor's icon. In the absence of a vendor's photograph of a vendor, the user may upload a photograph of the vendor's or the user's choosing.

According to other embodiments, the user may choose preferred vendors or other providers that are stored within the memory 102. In addition, according to some embodiments, the mobile application software may keep track of a user's selections, preferences, browsing, and general shopping behavior. In conjunction with such embodiments, the app can be configured to incentivize repeated use by individual users by providing gamification opportunities. A vendor can provide rewards for frequent use, and affords special deals to repeat users of its app. Deals may become more exclusive and more appealing to the consumer with increased use of the system. As use becomes more frequent, either through voice commands or physical contact with the mobile device, the application may increase its personalization and gamification to the user. This allows the application to suggest particular products, goods, and services, and provide the same special deals or discounts the user prefers based on prior browsing and shopping history.

Example 2

Some embodiments provide a novel means for a user to search for a particular merchant. Users can select a merchant by typing or speaking the merchant's name into to the application. The application identifies the user's choice and displays the advertiser's logo on the app icon. Distance and directions to that merchant's store are found by further repeating the method as described. When a user is in travel, in some embodiments, the application may display only the stores that are in the direction of travel of the user. In some embodiments brand markers on the map may be based on the direction in which the user is traveling. Brand markers may be displayed when they are within a 45 degree deviation of the user's current direction of travel. In other embodiments brand markers may be displayed in search results or on a map when they are within a defined deviation from a current direction of travel. The range of defined deviation may be about fifteen degrees and about ninety degrees on each side of the direction of travel.

As a user approaches the destination of the merchant, the icon or portion of icon may glow different colors, indicating additional information that may be of interest to the user. For example, when a user is a certain distance away, (for example, more than two miles), the glow 210 of the eye 165 at the bottom edge of the icon 160 may be a particular color, such as yellow. As the user gets within one mile to the merchant's store, the color may change to blue, or glow a more intense shade of yellow. When the user gets substantially close to the desired destination, (for example within a quarter of a mile), the color of the glow may change again, for example to a red or different shade of blue, or glow an even brighter yellow.

Further, at some point along the travel, eye 164 at the top edge of the icon 160 may alert the user as to whether the merchant destination has a special deal, sale, news, product, or other novel event. When the app has a pillow-shaped configuration as described hereinabove, one or both eyes in the pillow-shaped icon may glow a unique color, for example a shade of green. The user can press the icon to learn more about the deal, sale, news, product, or other novel event. Alternatively, the application may speak, or play an audio file to alert the user of such information. To learn more about the deal, sale, news, product, or other novel event, the user can press the icon, or provide a verbal command to the application. Either way, the application may then convey information about that advertiser's deal, sale, news, product, or other novel event to the user.

Example 3

Some embodiments include a voice recognition enabled platform for using the app via a mobile device. Through use of the mobile device's GPS capability, the application locates vendors situated near the user throughout a certain radius predetermined by the user. In the absence of a voice command, the application may select vendors based on the user's search and browsing history, but mainly by user preference. In some embodiments when the application completes the search, it may populate the main interface with at least six vendors, but can display as many vendors as would be practically visible on the display screen, and additionally the user may scroll up and down the main interface. The app may display an individual vendor as a pillow-shaped icon. An icon may feature the logo 167 of a particular vendor on the pillow-shape's front face 166. The icons 160 may be arranged in a grid-like lattice. Icons 160 may feature additional graphics which alert the user to useful information.

Users may not find what they need simply by browsing different vendors; instead, they may want information on a particular good, product, service, deal, or sale. In some embodiments when a user wants to search for a particular product, service, or vendor, he may use the search screen or the application's voice recognition capability to search for the specific good, product, service, deal, or sale desired by the user.

When the application is ready to begin searching, it displays a search box on search screen. The search box may have a first written message indicating that the application is ready to begin searching. The user may then manually type in on the keyboard of the mobile device the specific good, product, service, deal, or sale for which the user seeks information. Users may create search input via voice commands. The user speaks the name of a particular good, product, service, deal, or sale to the application.

The application's voice recognition capability may acknowledge the name of the particular good, product, service, deal, or sale and displays it in search box. In the present example, the user wants to search for lamps. The search box also visually confirms lamps as its search parameter. The application's voice playback capability may then speaks the name of the particular good, product, service, deal, or sale back to the user. The voice playback capability further informs the user that it is currently searching for lamps as indicated by the searching prompt.

When the search completes, the application may transfer to a results screen and graphically display vendors that sell lamps. The application can list results in a number of different ways: to vendors located throughout a certain radius predetermined by the user; by the user's favorite vendors; or by vendors having the best reputation as determined by members of the community, social media, or other rating system.

In continuing the search, a single vendor of the many located may interest the user. To select the individual vendor, a user may tap the icon with that vendor's logo, or say that vendor's name aloud. When the application recognizes the user's physical or verbal input, a menu or other pop-outs 170 may be displayed next to the selected icon 160. The menu contains information specific to that vendor. The menu may include a textual depiction of the vendor's name and address, but the menu may also contain the vendor's phone number, website address, as well as other forms of contact information. Underneath the address a series of buttons may be displayed each performing a separate function. One such button, indicated by a steering wheel icon, may provide driving directions to the vendor's location. A button indicated by the telephone receiver icon, may instruct the application to call that vendor at that location. A button depicted by a planet icon, may instruct the application to open a third party map program and show the vendor's location on a map. Further, users may store this particular vendor as a "favorite" by selecting a "favorites" button located on the menu. Users may revisit vendors they have identified as favorites by selecting a separate favorites interface.

Figure 18A:
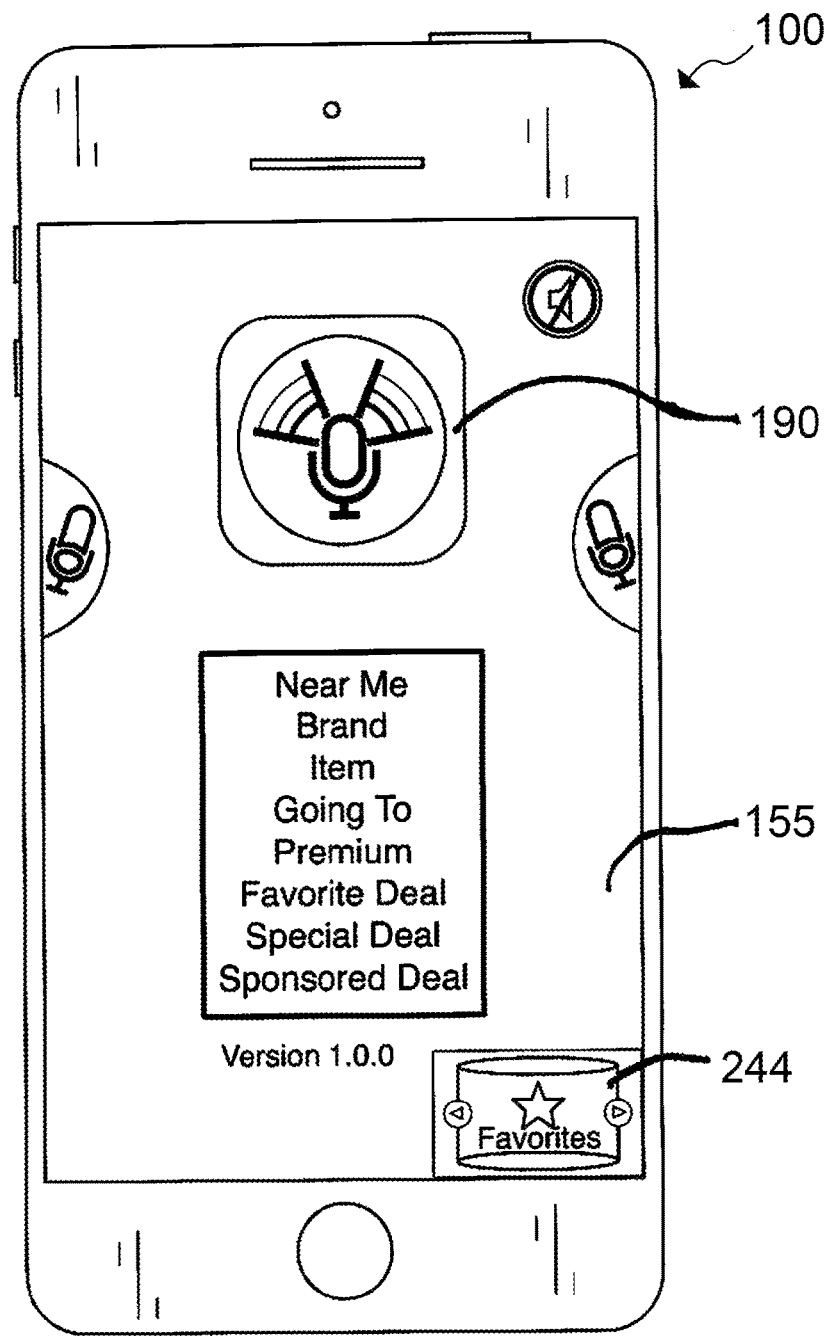
FIGS. 18A through U exemplary illustrations showing one or more snap shots of an interactive user communication with a mobile device wherein the device provides the user a variety of information.
Figure 18B:
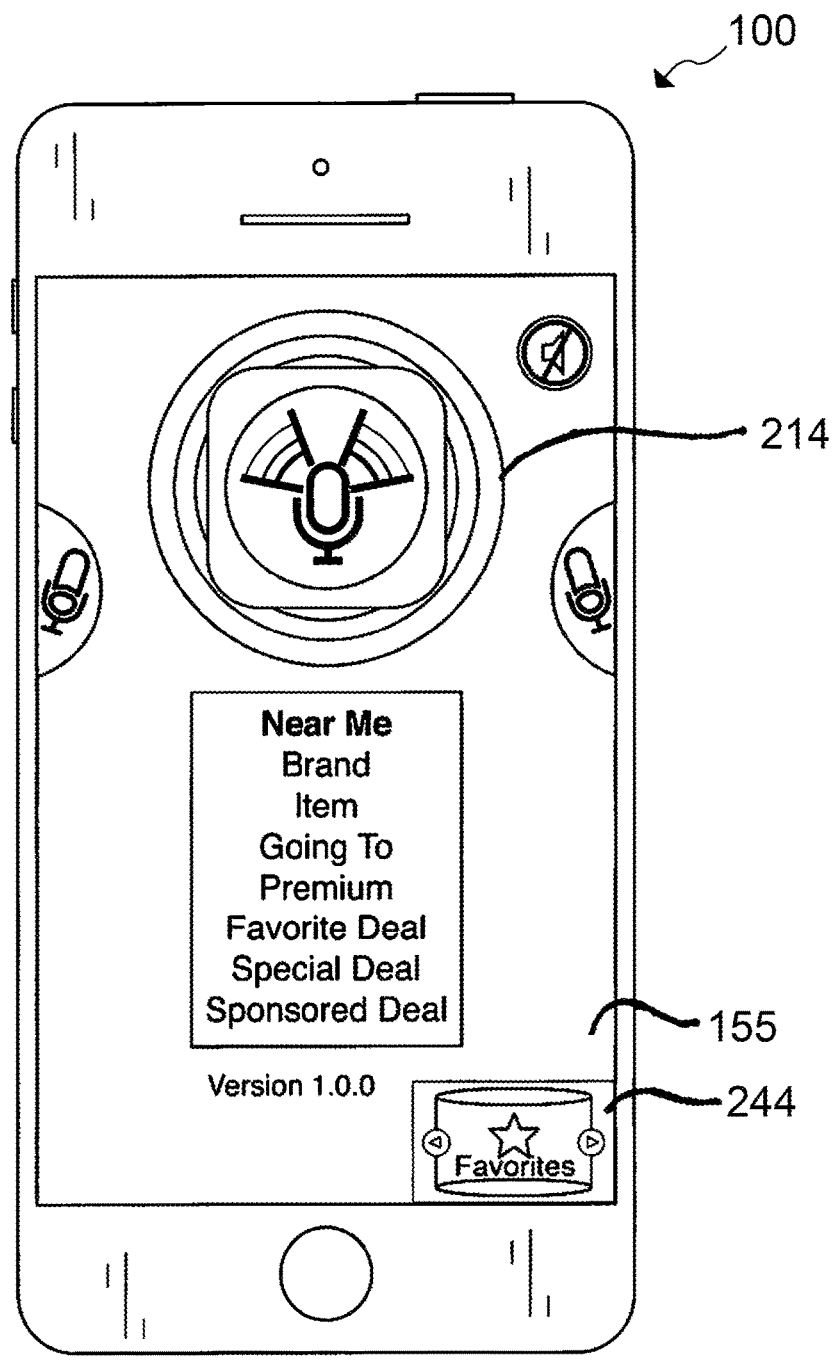
Figure 18C:
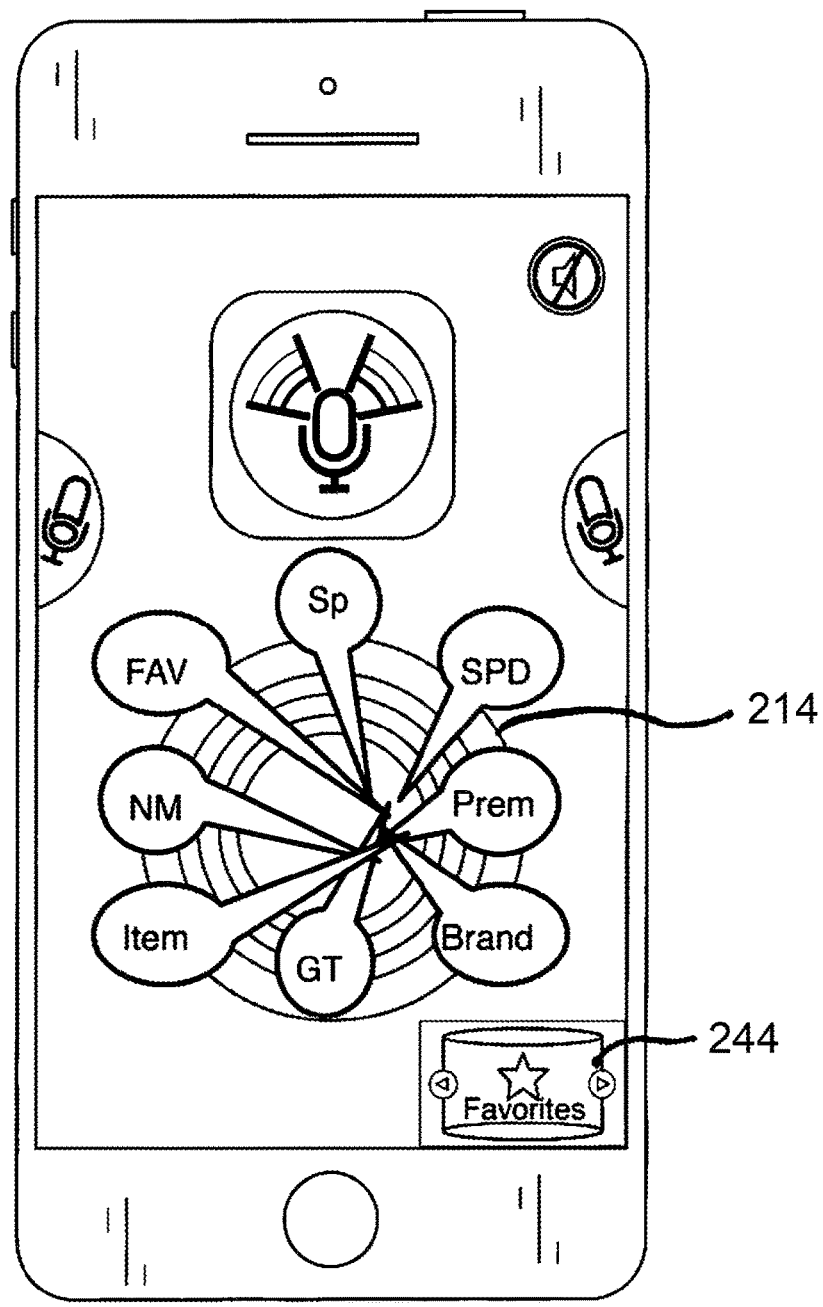
Figure 18D:
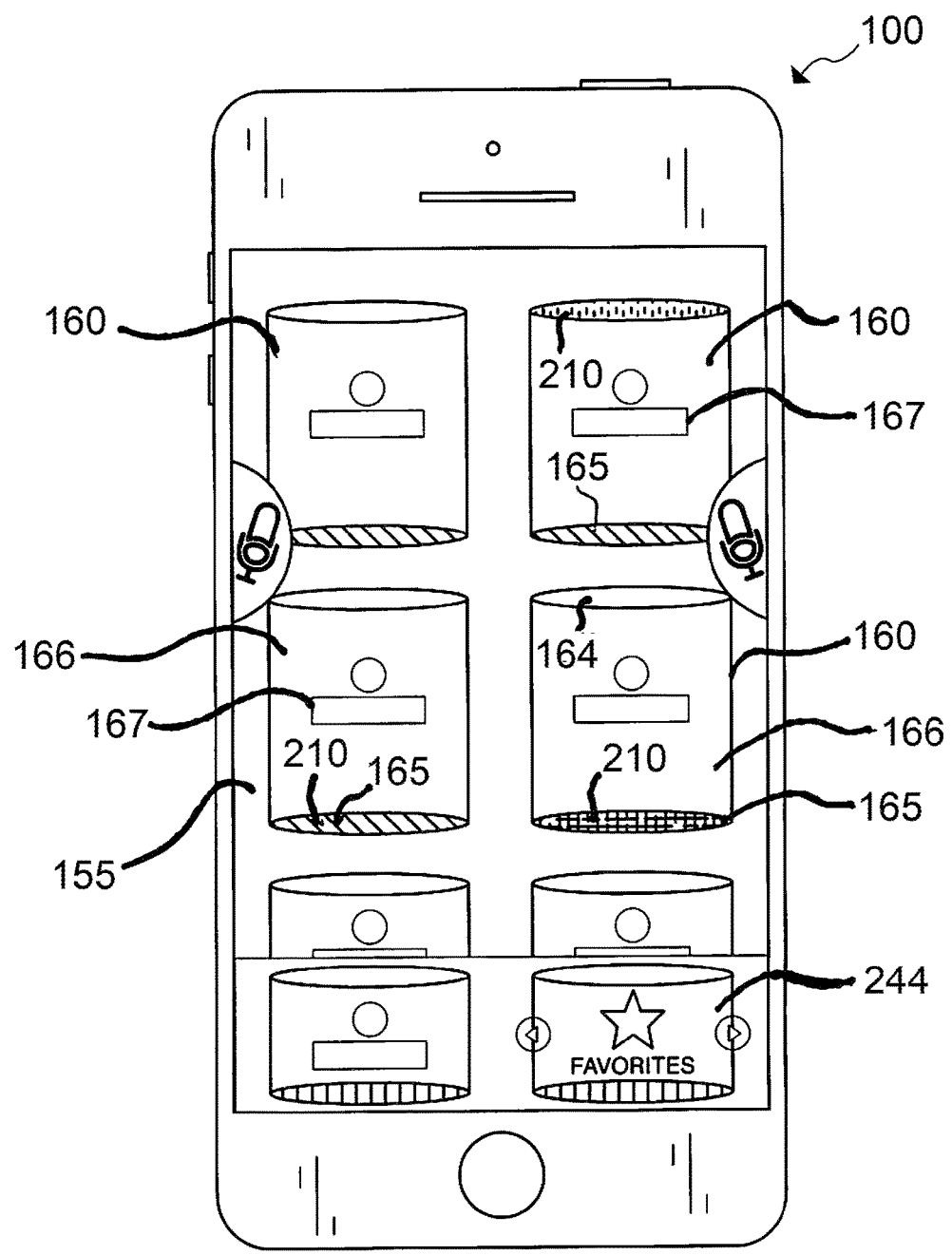
Figure 18E:
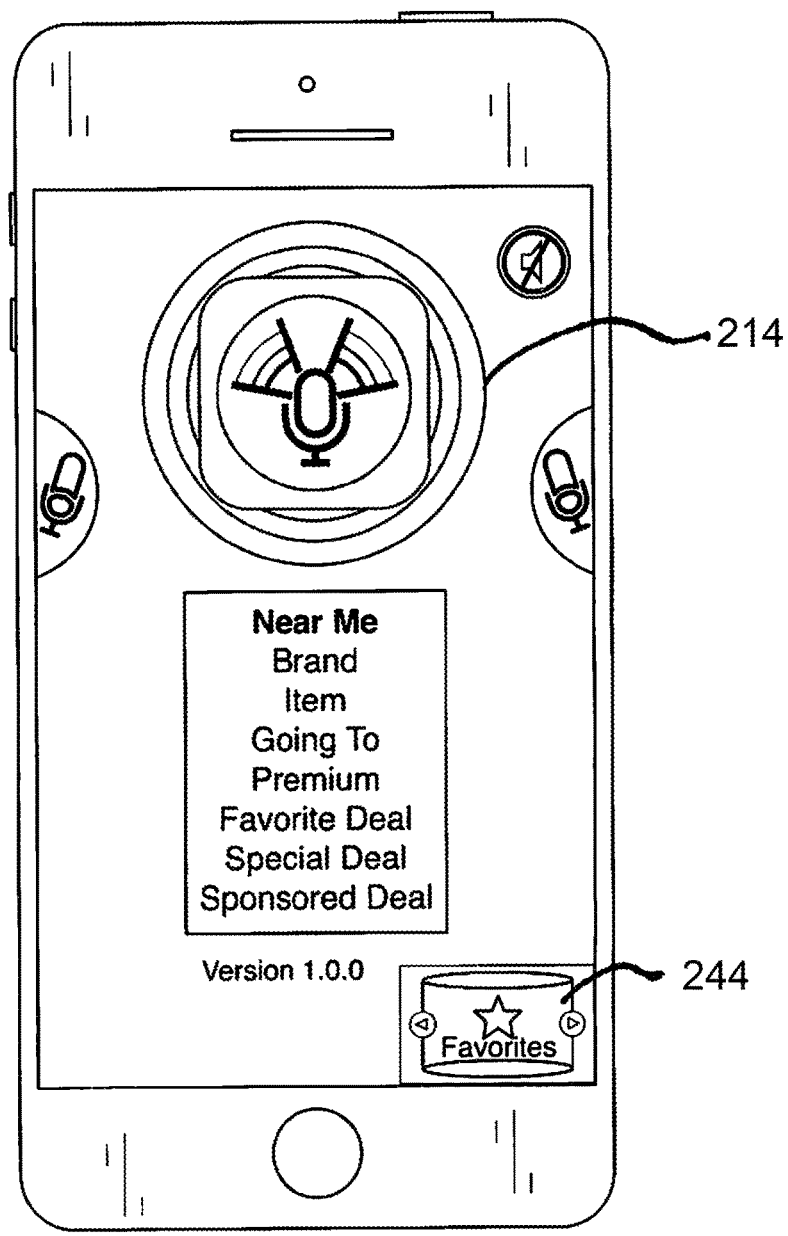
Figure 18F:
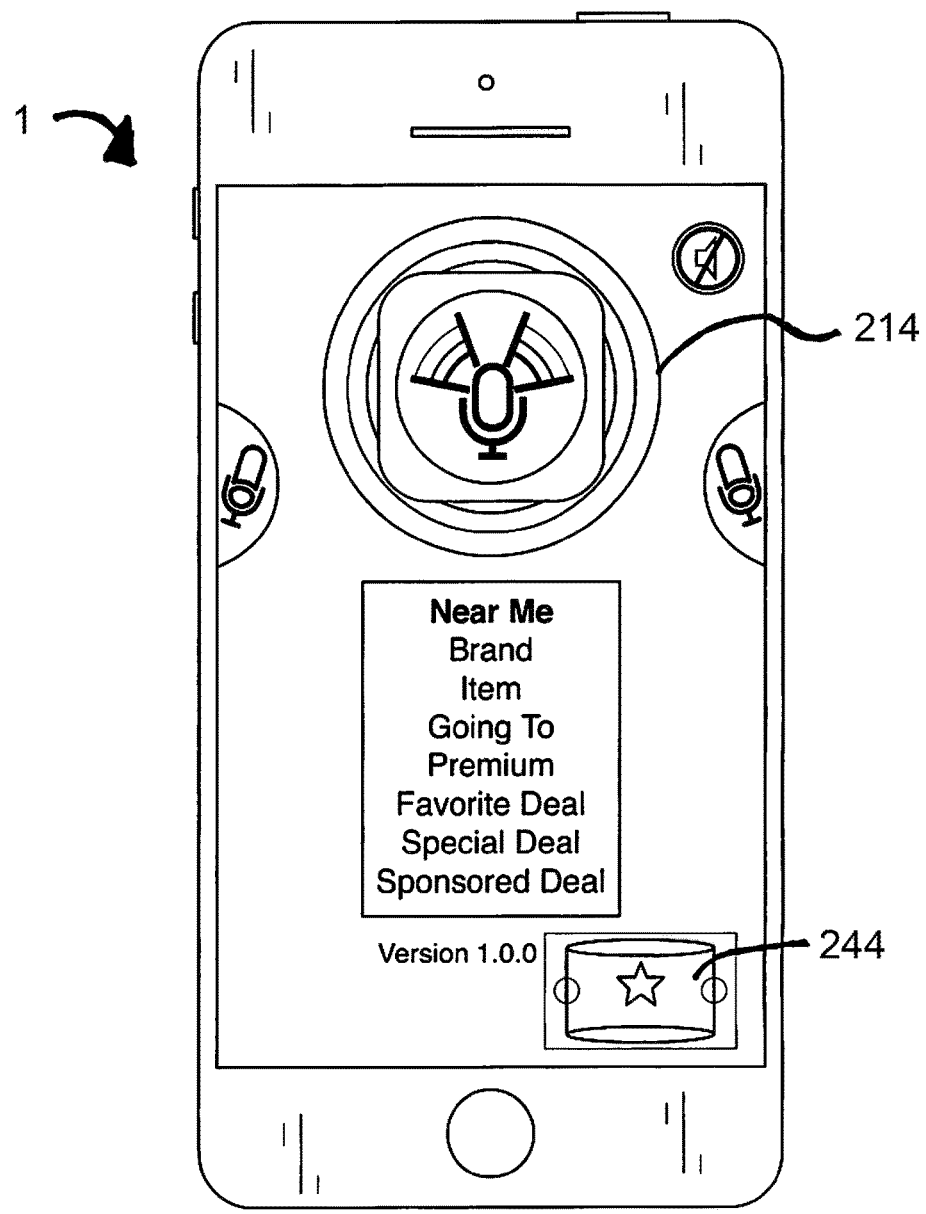
Figure 18G:
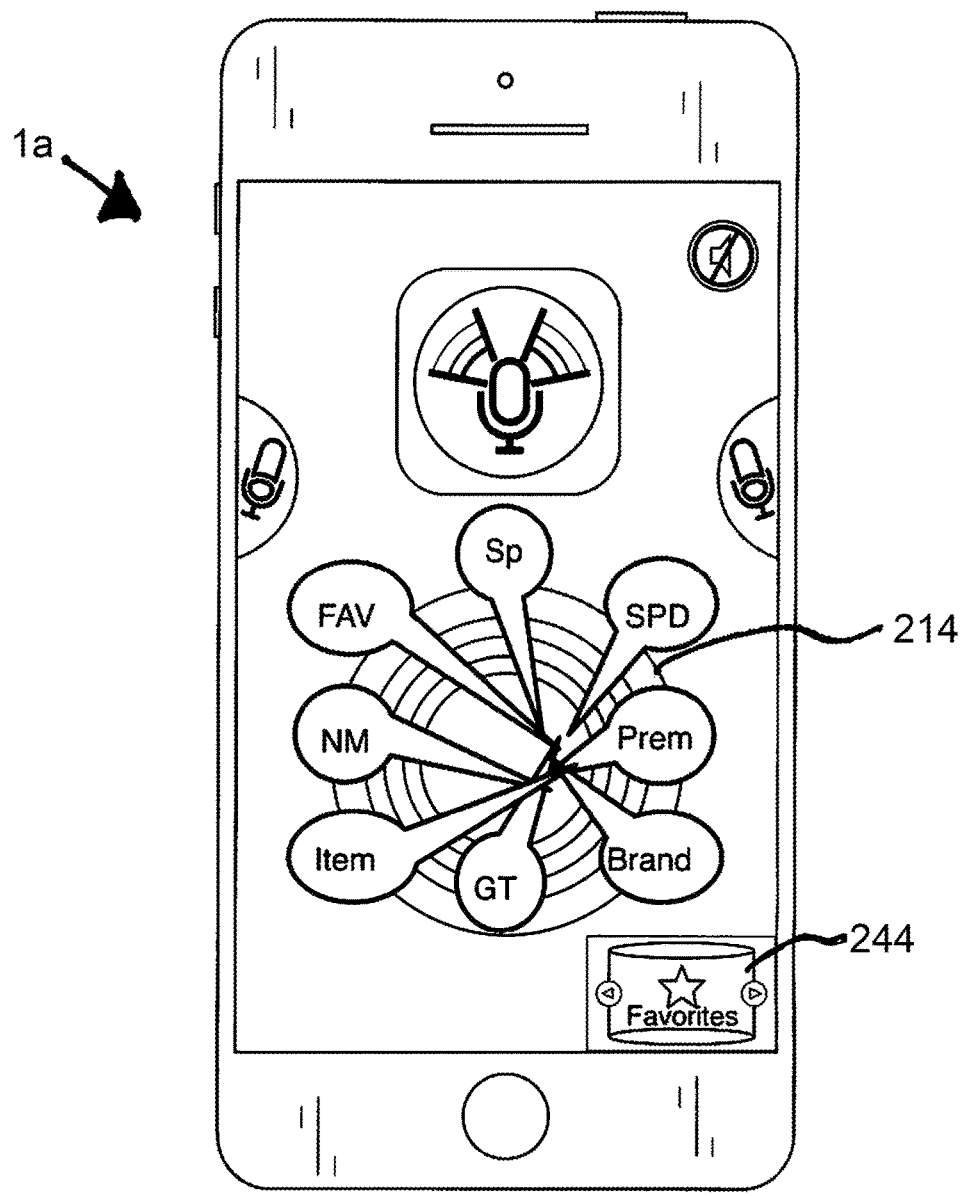
Figure 18H:
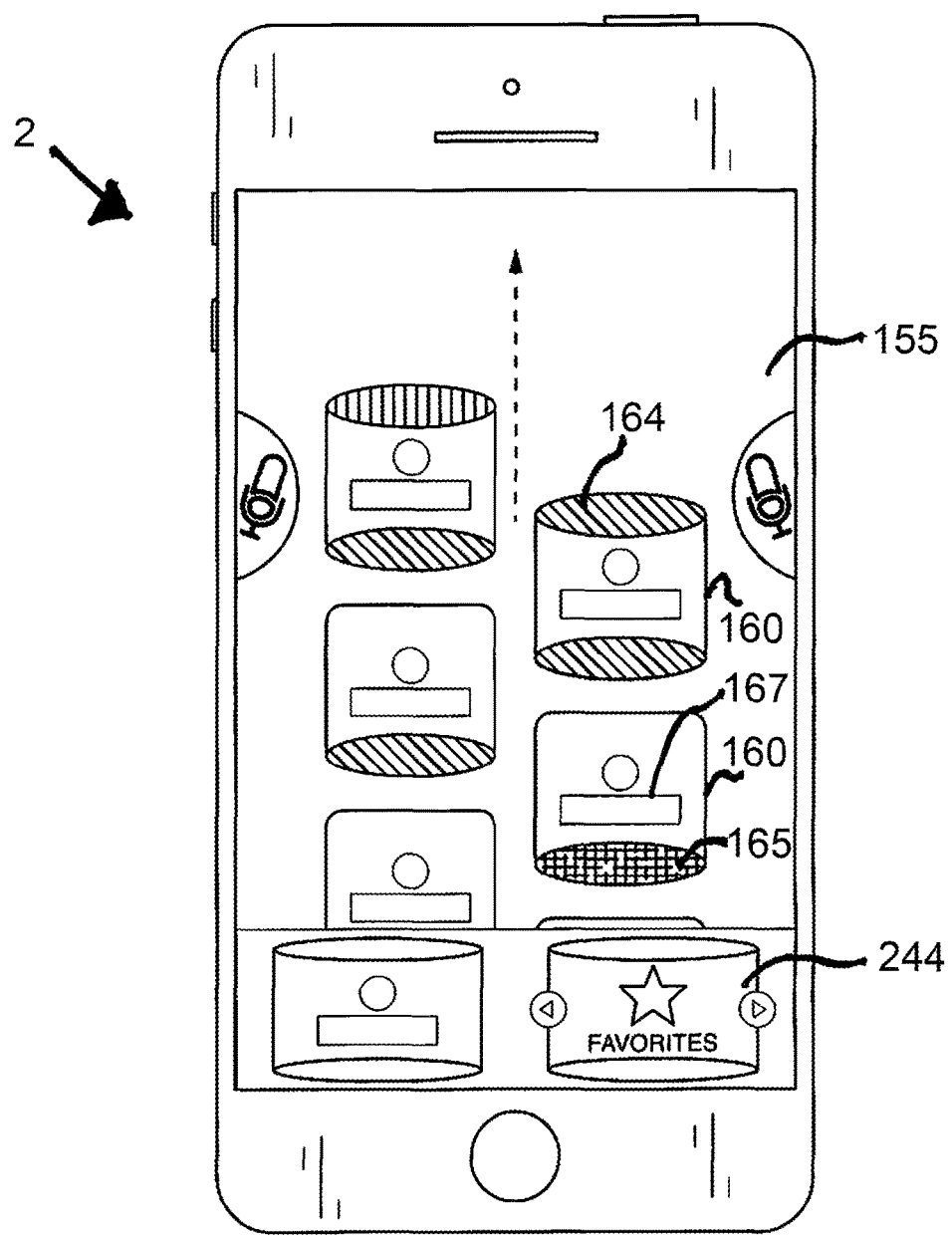
Figure 18I:
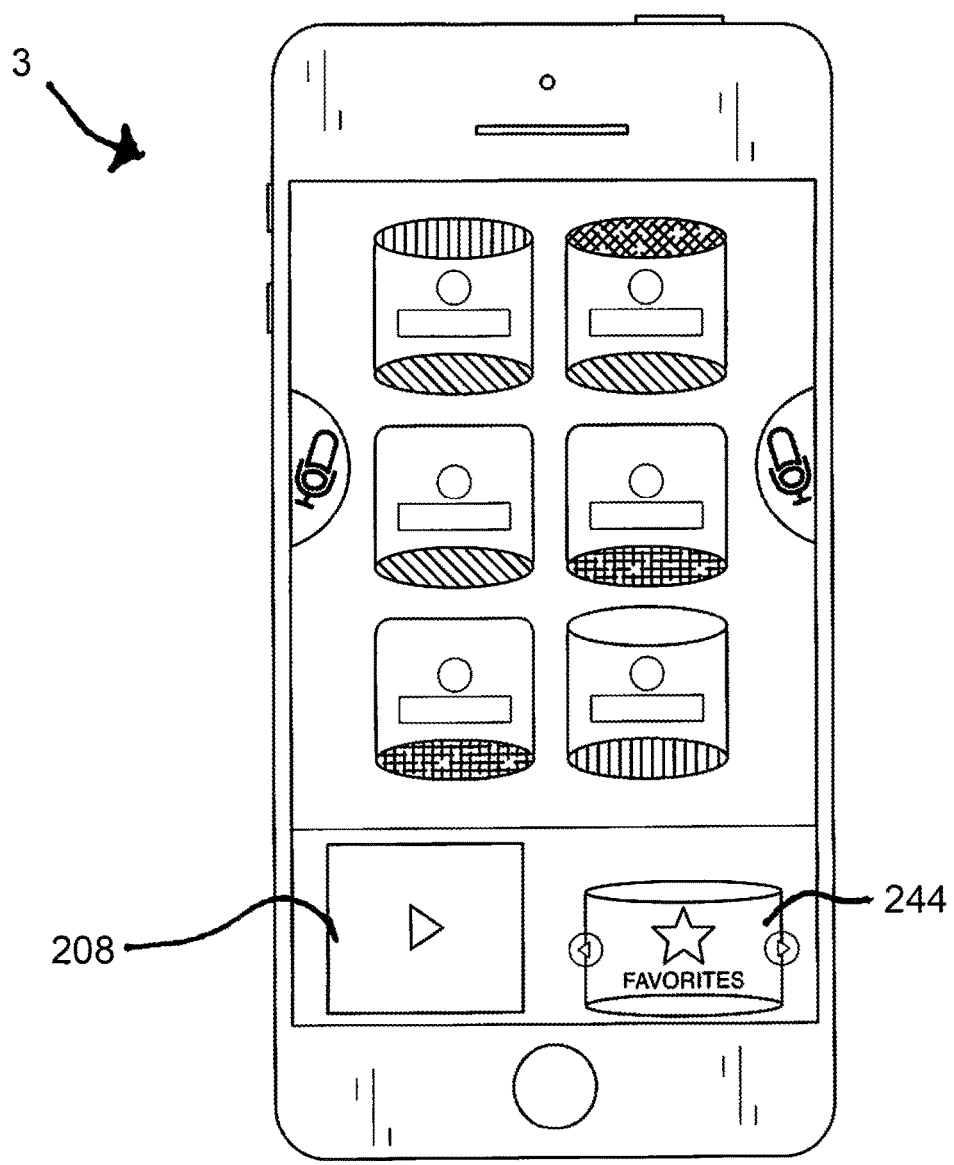
Figure 18J:
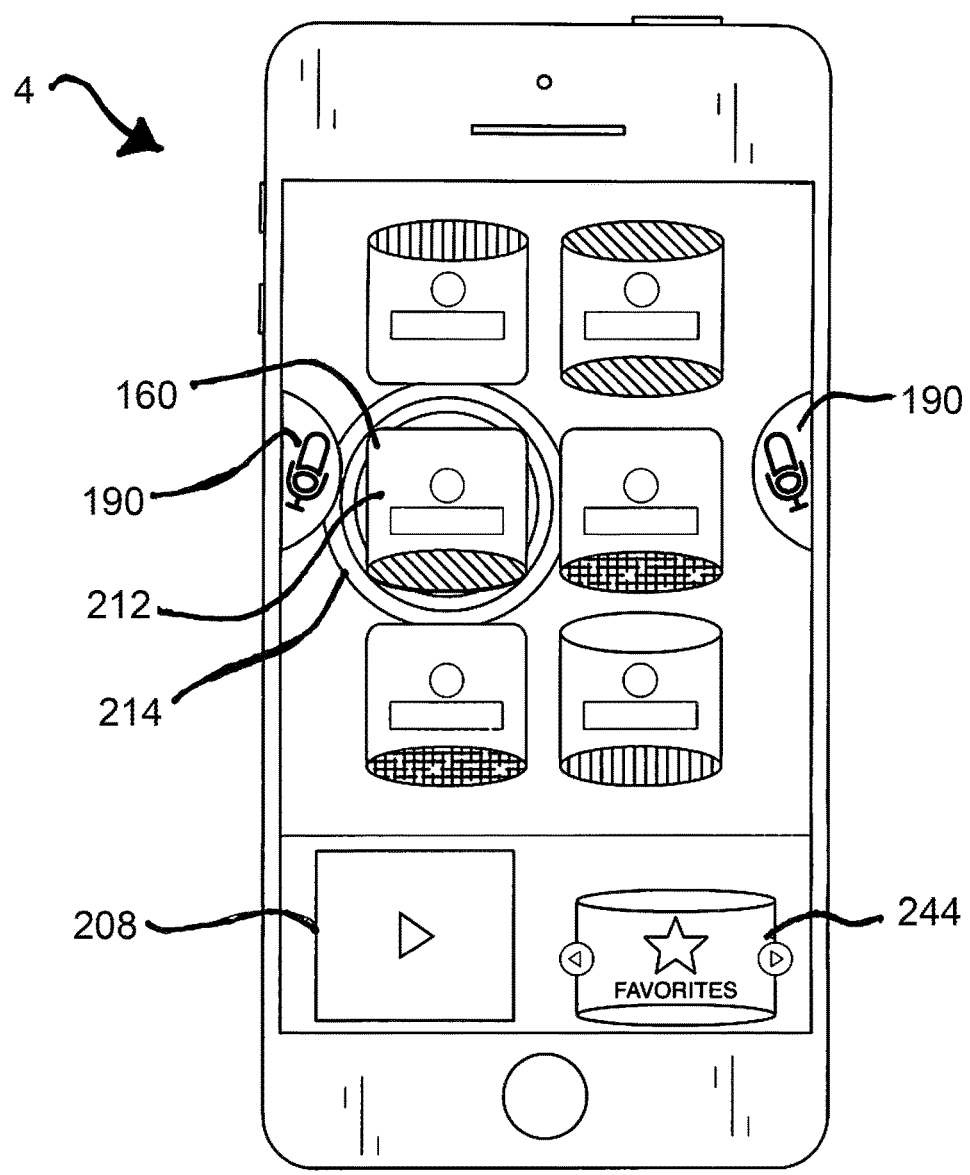
Figure 18K:
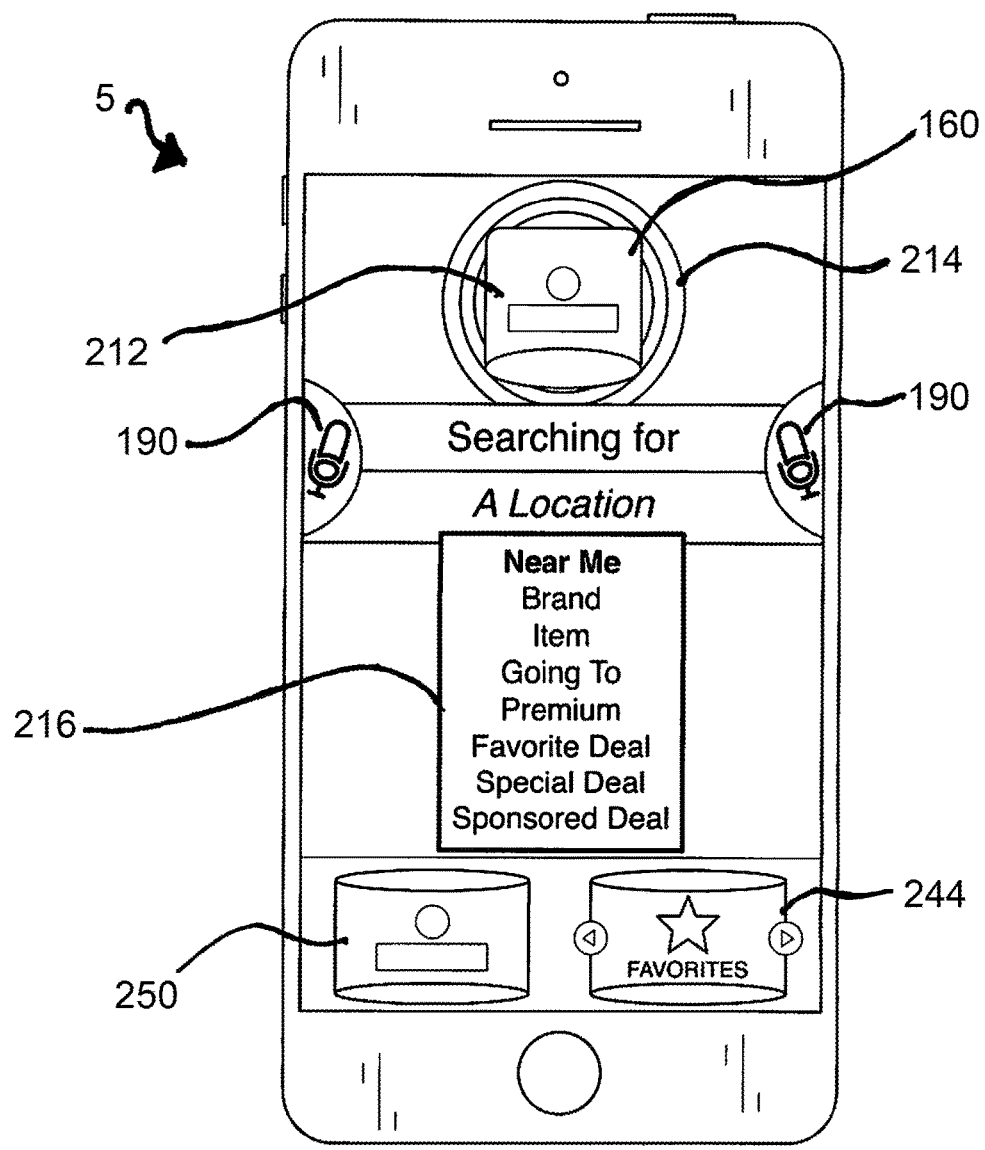
Figure 18L:
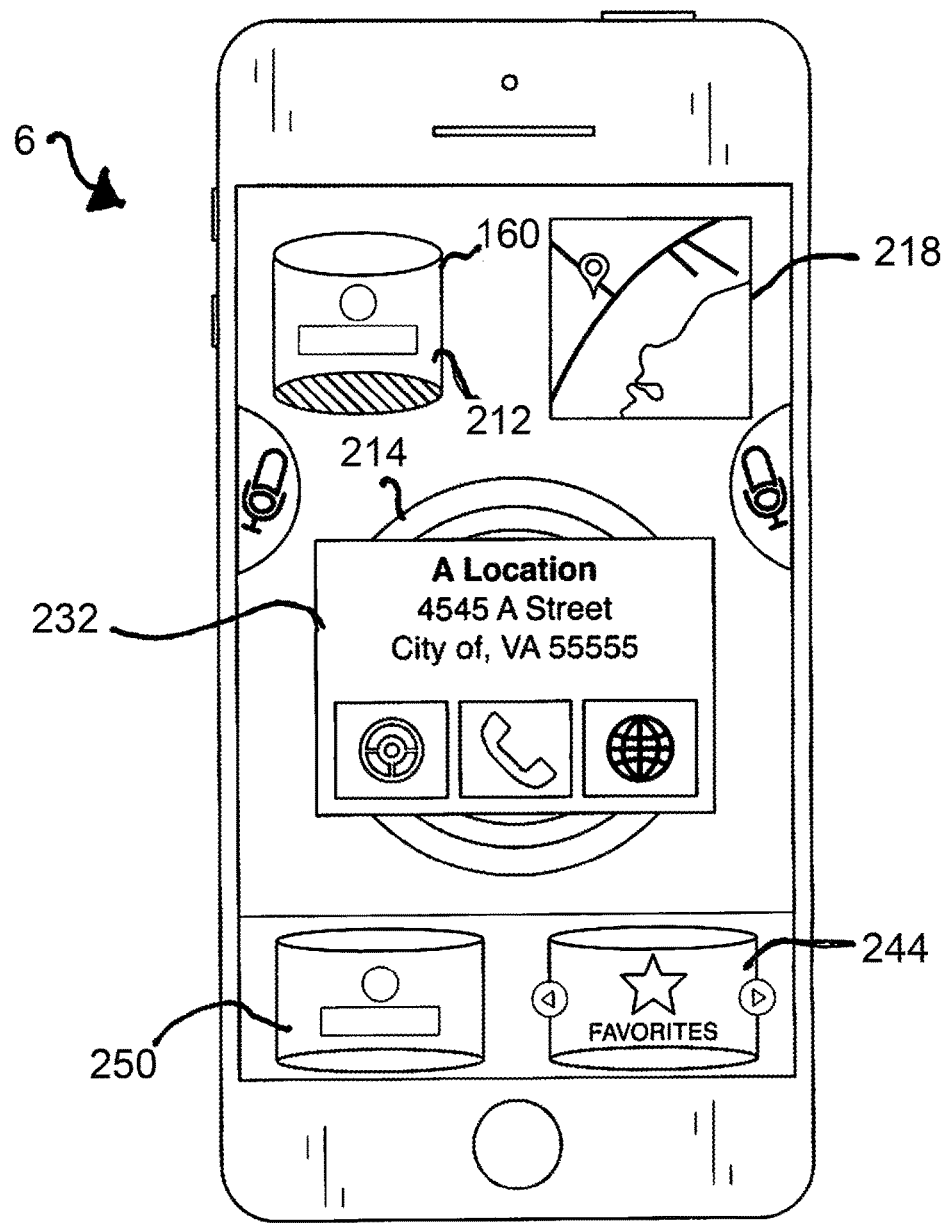
Figure 18M:
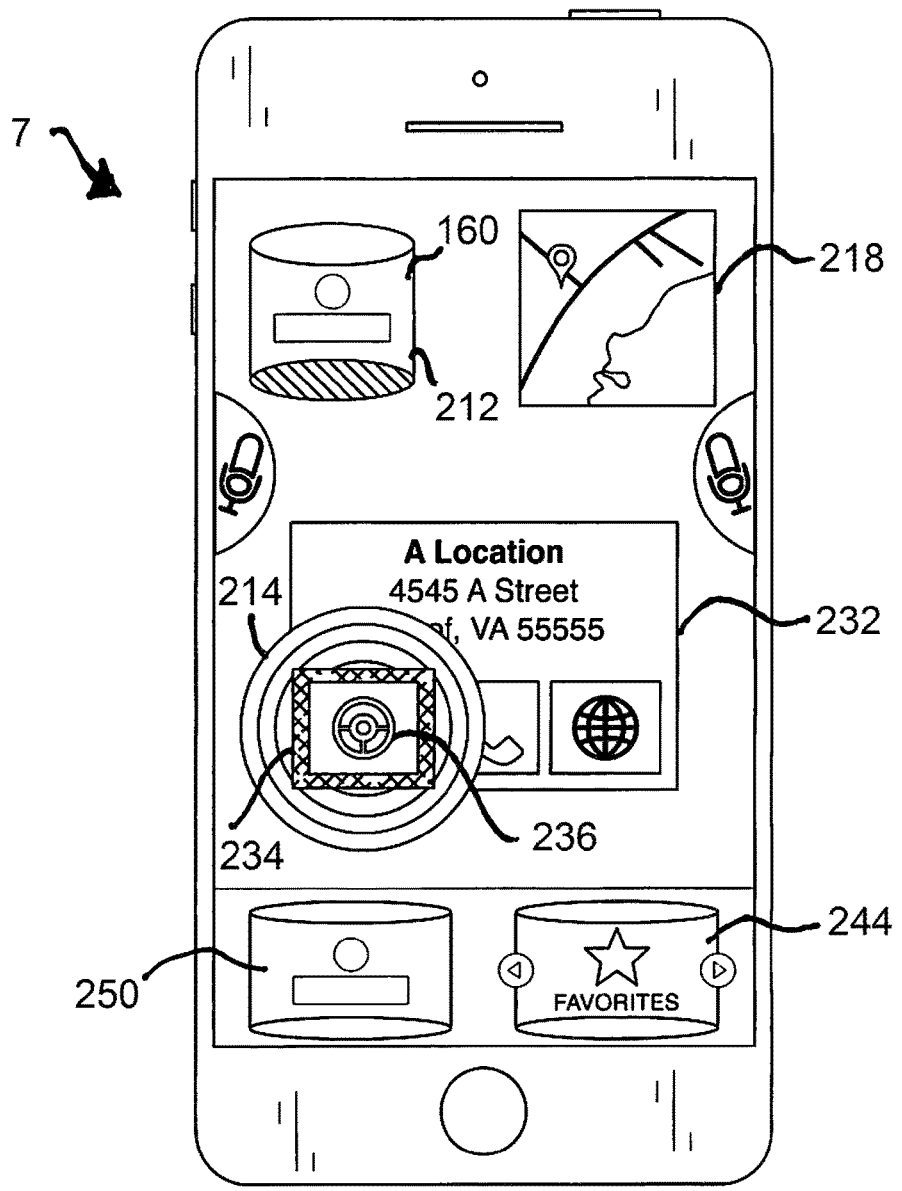
Figure 18N:
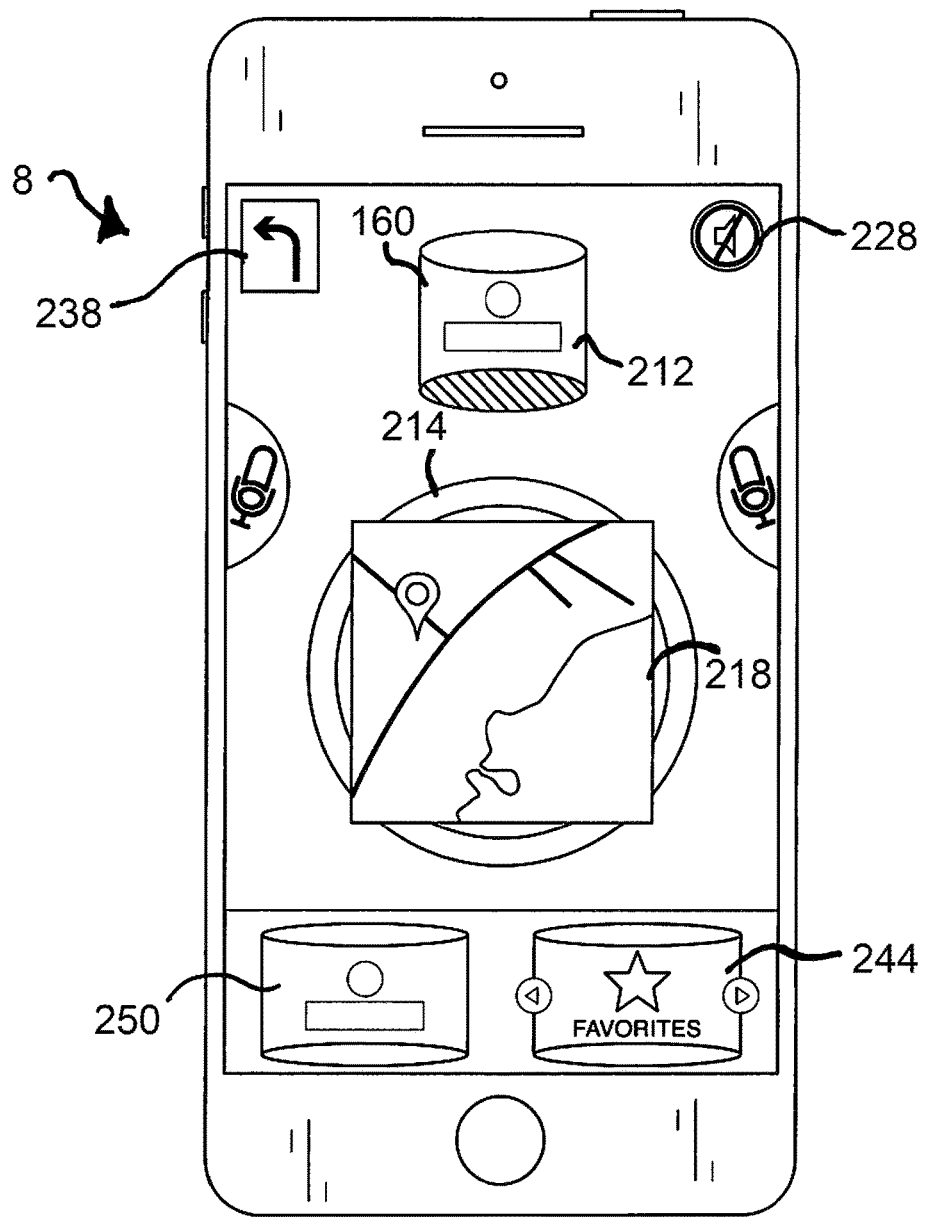
Figure 18O:
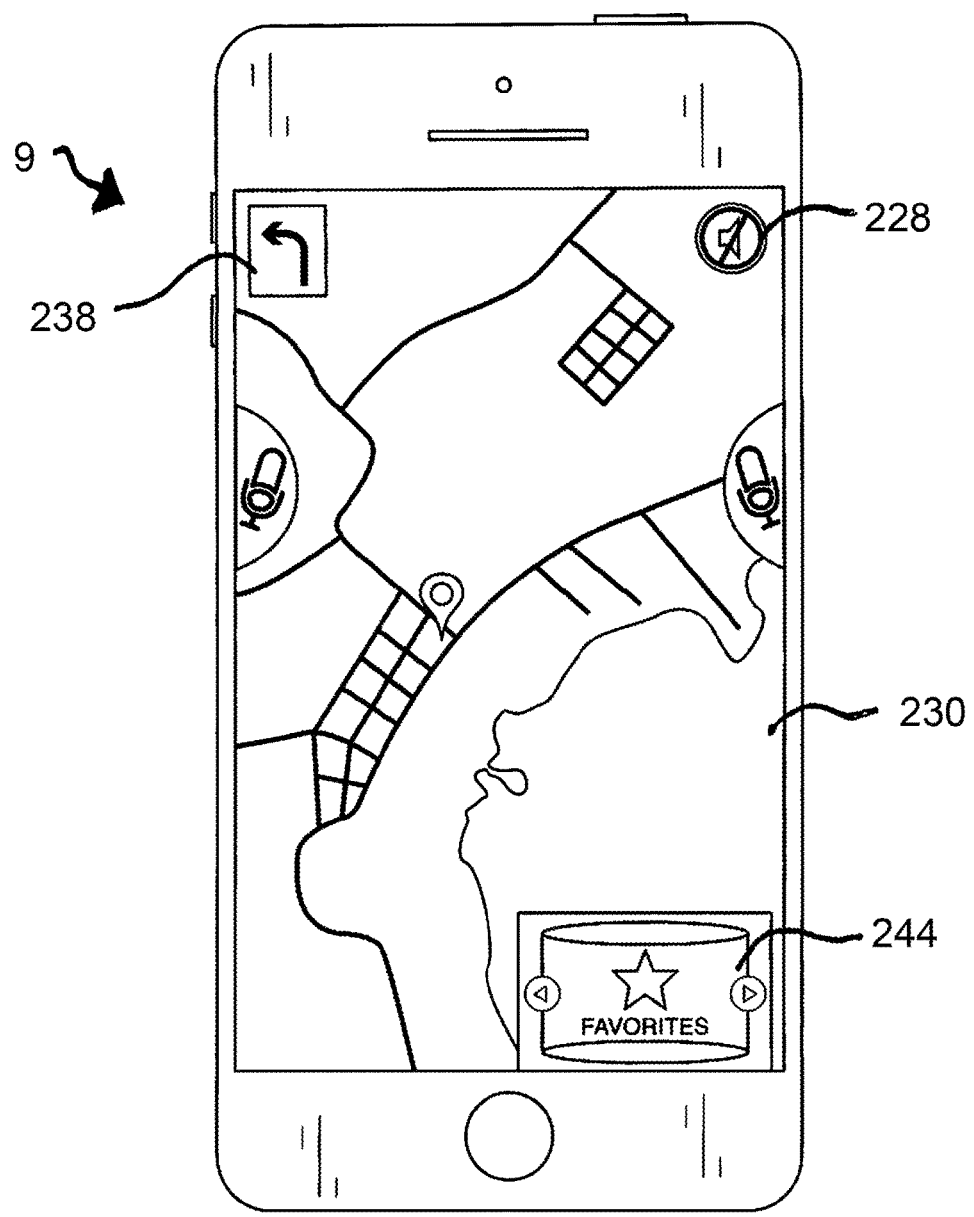
Figure 18P:
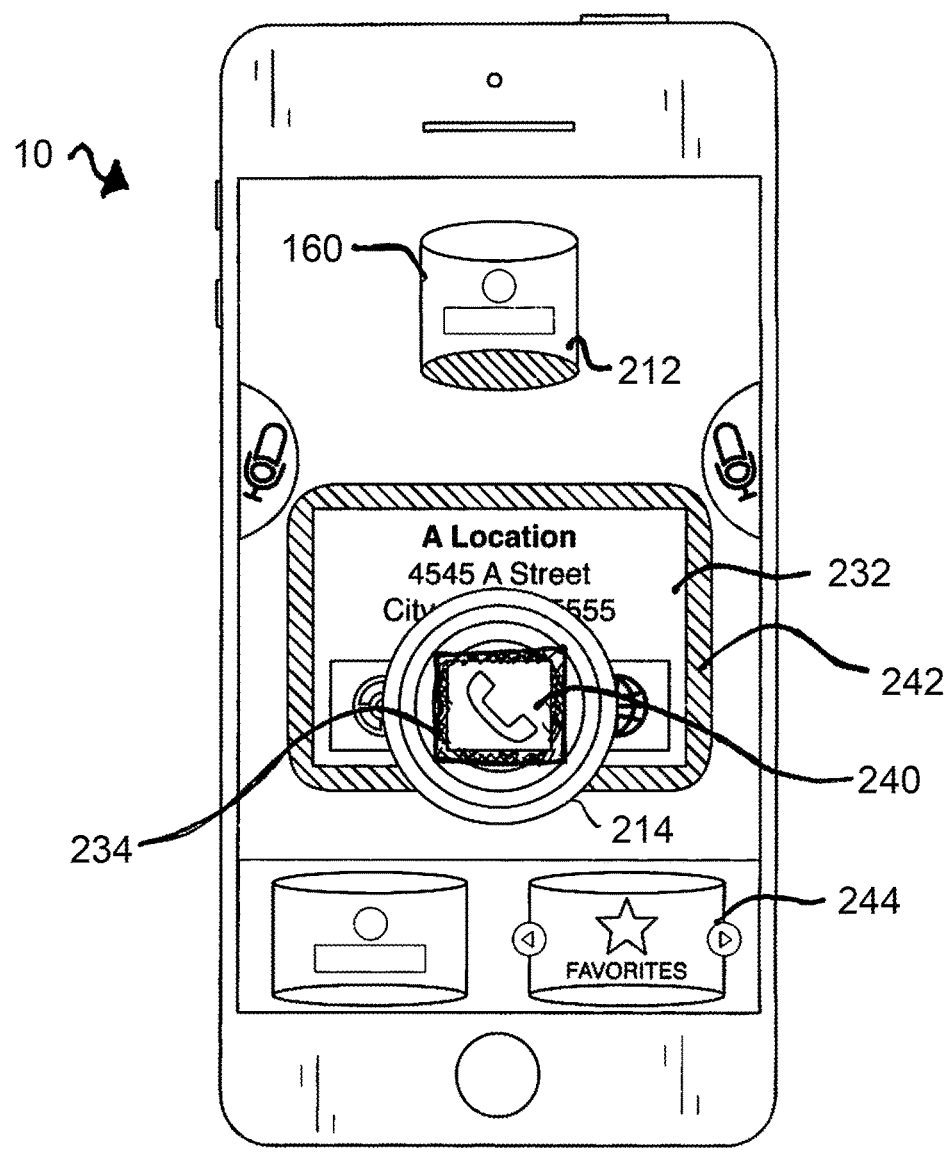
Figure 18Q:
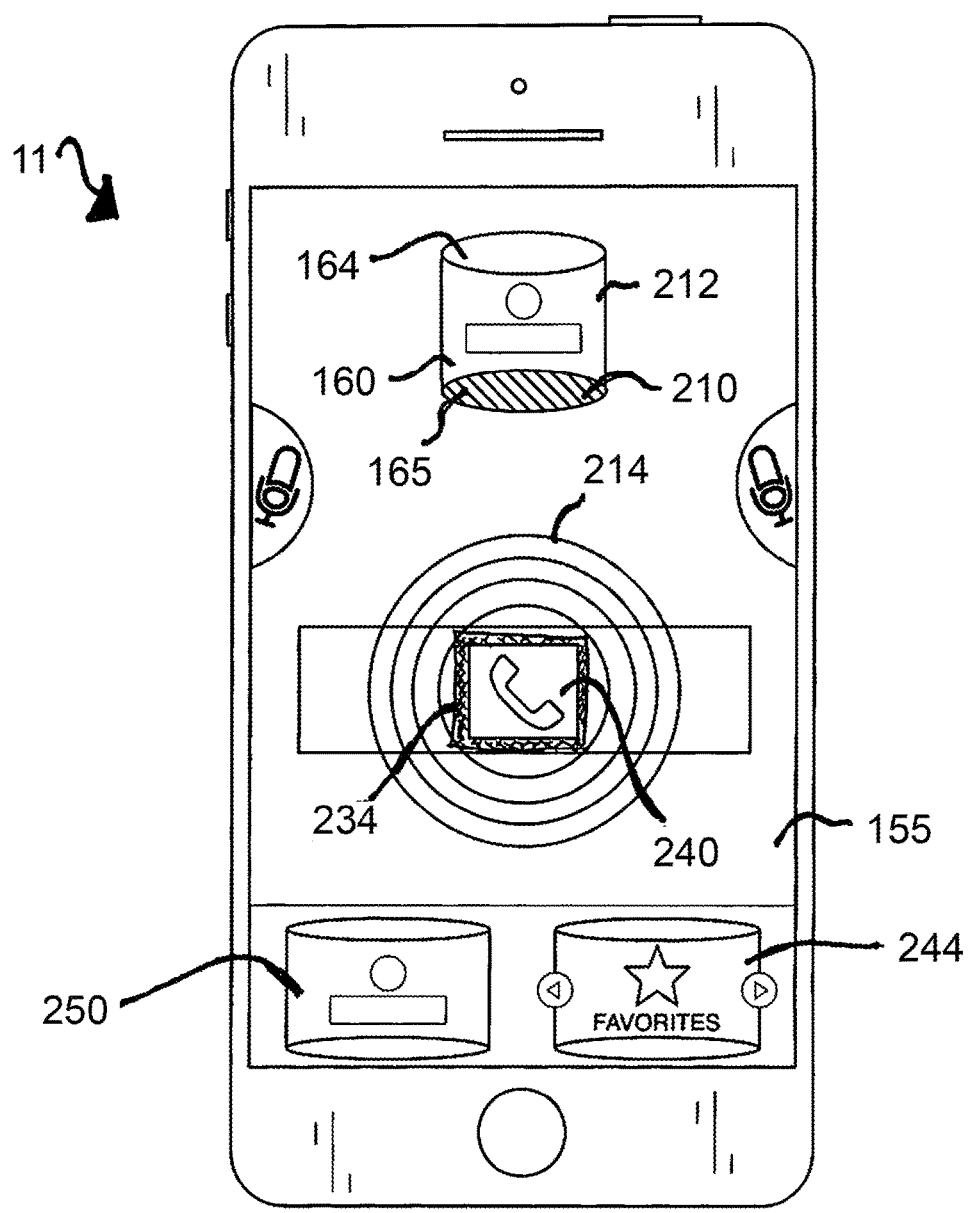
Figure 18R:
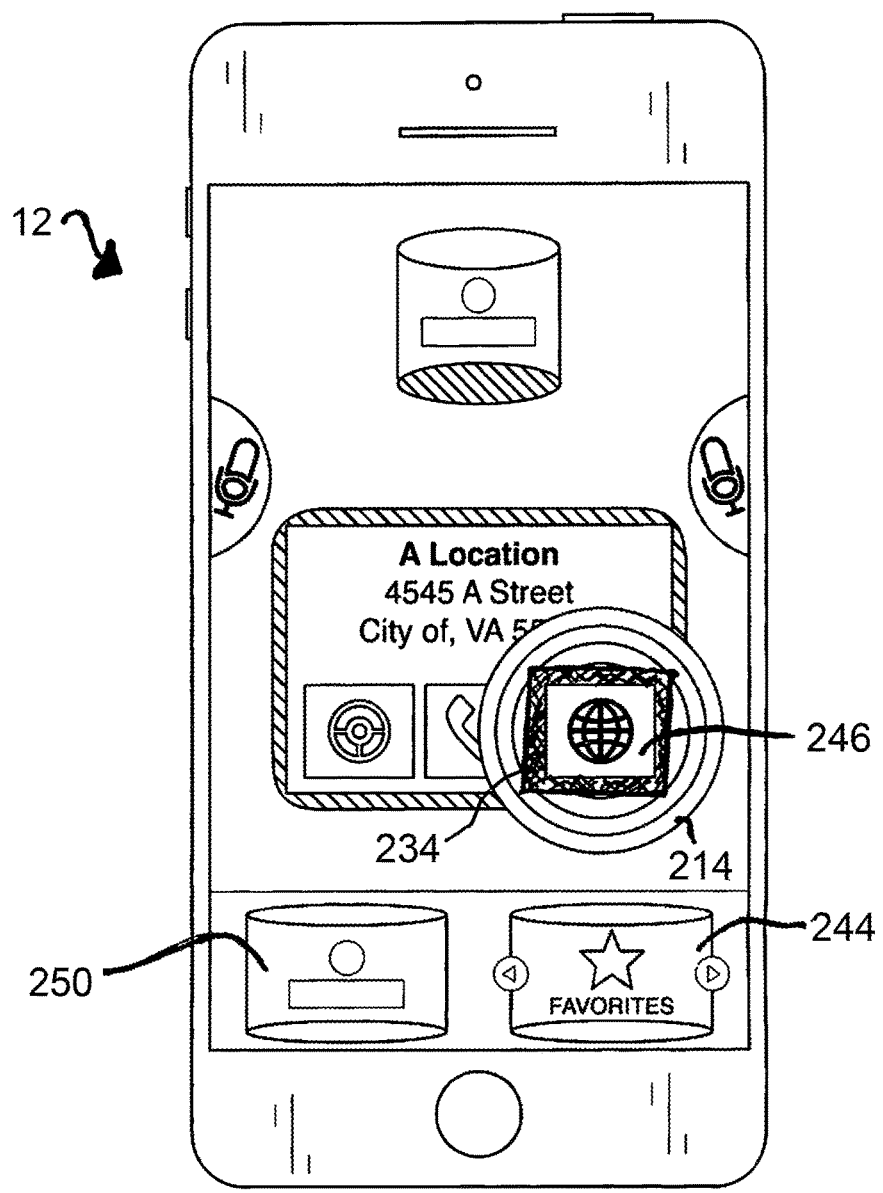
Figure 18S:
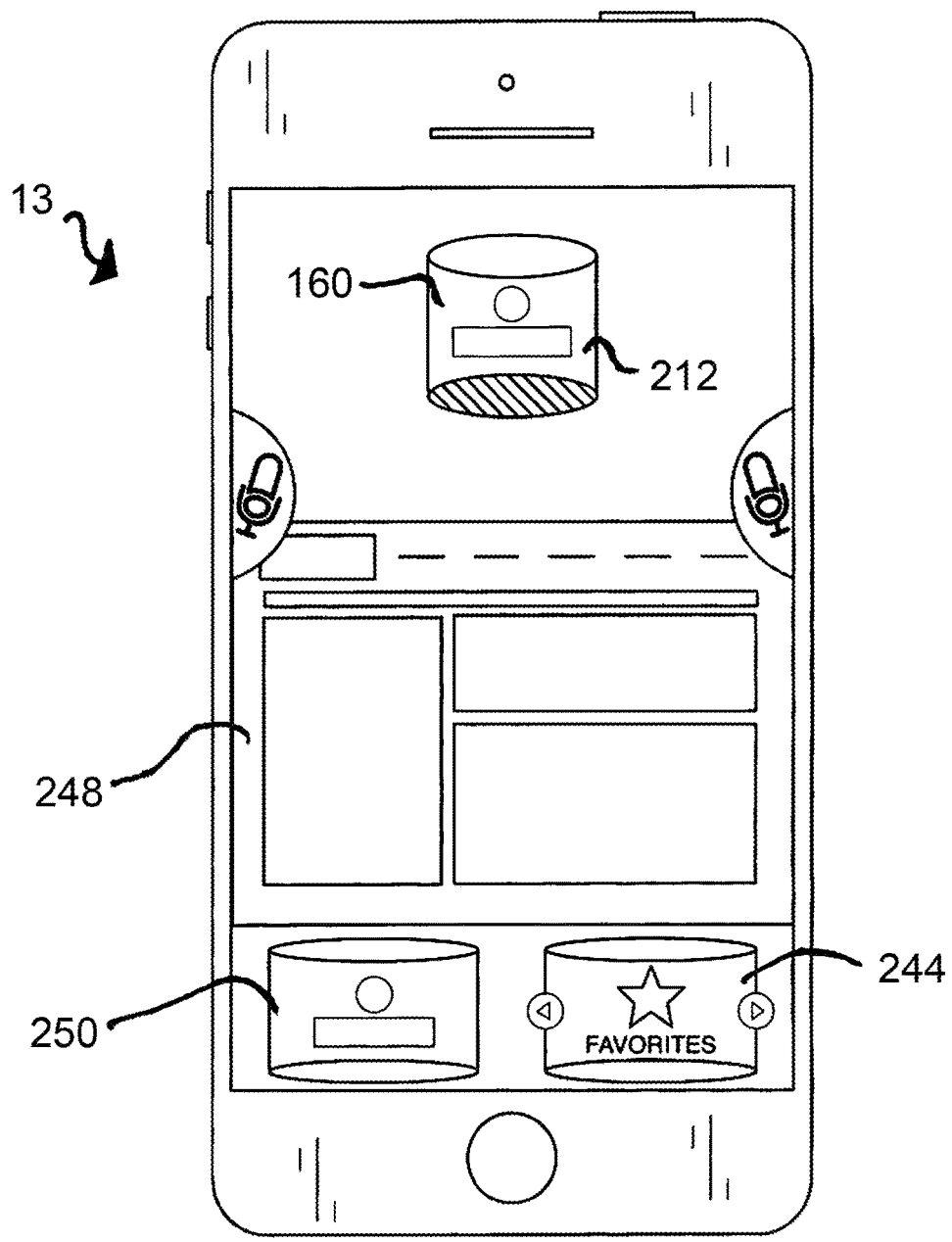
Figure 18T:
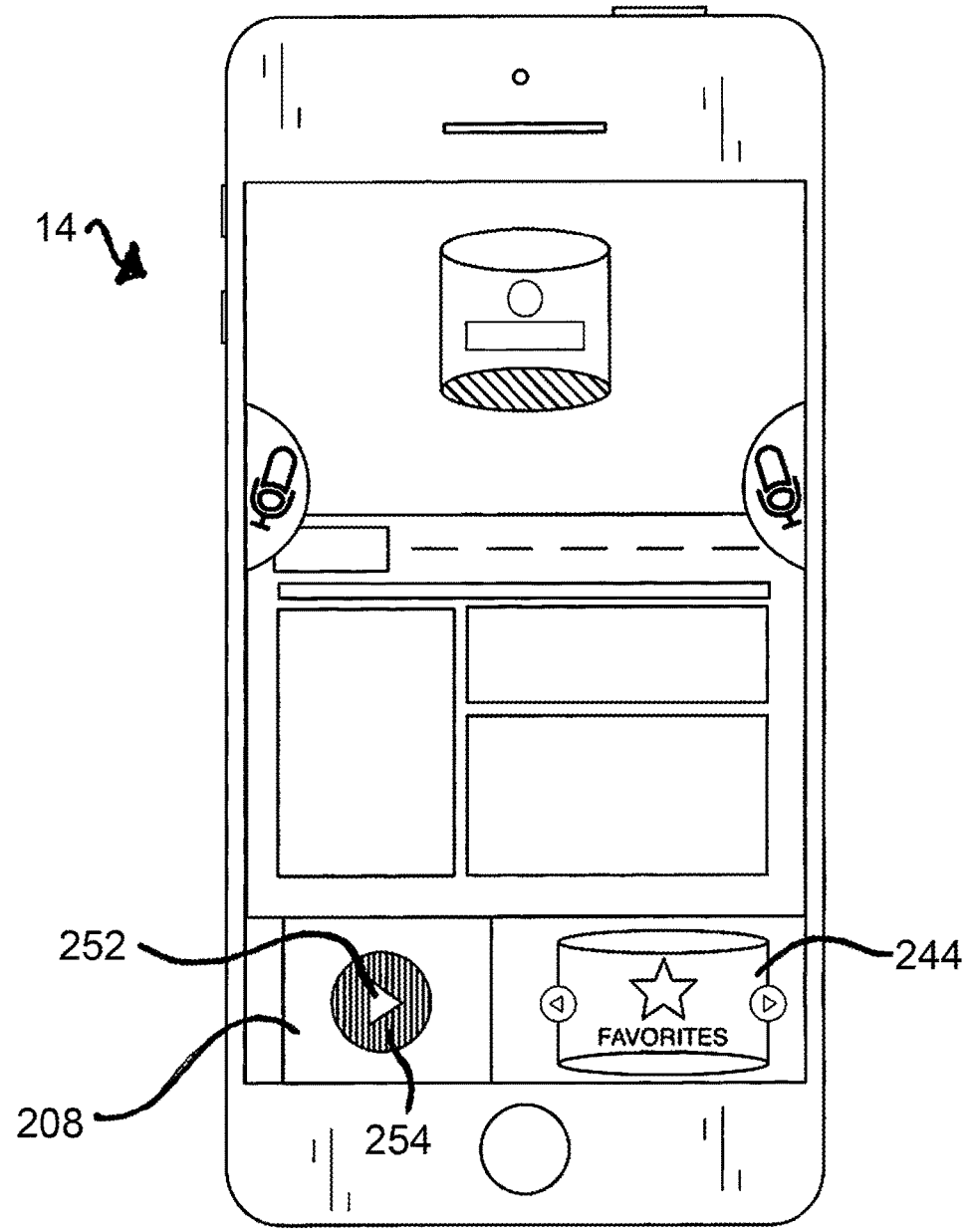
Figure 18U:
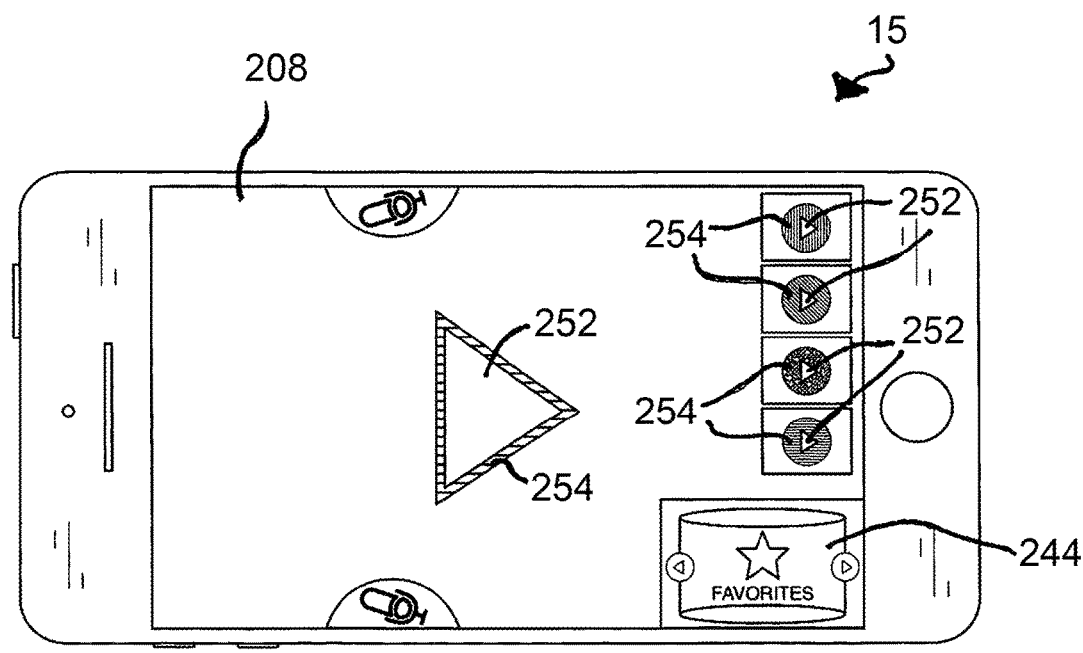

FIGS. 18A through U provide exemplary illustrations showing one or more views of an interactive user communication with a mobile device wherein the device provides the user a variety of information.

A user may activate voice input and voice output. In some embodiments a mute button is available for the output to enable use in an environment where the user does not want to be heard or disturb others.

A menu may be displayed in multiple formats. In one example a menu is displayed with the words "near me", "brand", "item", "going to", "premium", "favorite deal", "special deal", and "sponsored deal". In other embodiments a menu can be displayed as bubbles, icons, images, or abbreviations. In one embodiment abbreviations are used with "NM" meaning "near me", "Prem" meaning "premium", "FAV" meaning "favorite deal", "Sp" meaning "special deal", and "SPD" meaning "sponsored deal". The menu items may represent a shortcut for searching for information with "near me" requesting information on store locations or deals that are physically close to the location of the user, "brand" requesting a search for items, sales and information from a specific brand, which may include location information on where the brand is sold, "item" requesting information on a specific item that may be sold under multiple brand names, the results may include locations of stores close by that sell the requested item, "premium" may search for deals pre-selected choices, which selection may be offered to members who have a premium account or to anyone who has made pre-selected choices, "favorite deal" searching that includes information based on stored preference information for the user, "special deal" searching for specific types of deals such as closeouts, liquidations, or other large discount deals or deals that are not expected to be seen on a recurring basis, and "sponsored deal" which may search for a deal offered by a sponsor of a service, including a sponsor of service providing the search results.

In other embodiments menu items may be color coded and may include
  a. Near me=what's near me (default screen, what is near me, logos of pre-selected brands that are close by proximity);
  b. Seek=brand or item;
  c. Where you want to go;
  d. Premium=pre-selected choices;
  e. Deals=favorite, special, sponsored.

In some embodiments a user may select favorites and favorites may stay displayed on the screen to allow another choice can be made. A favorites button may allow a rotating list of the user's favorite uses/app to appear.

Visual effects may indicate what item is active on a screen for audio cues. For example audio cue happens with blue ripples.

When a user presses or says: "near me," near me may be highlighted on the screen in green audio sound to acknowledge that near me is recognized. In some embodiments a specific sound to near me command may be played to indicate that "near me" was recognized.

A slide selection feature may include: selected locations etc. slide up from bottom with opacity at 100% at the top and 50% at the bottom till all are in place then each is at 100%, it may include an audio/sound—a roll up swish.

In an example the screen also displays in a portion of the screen sponsored ad/revolving ads. The user may also get news feeds. In some embodiments the news feeds may show a nine second ad and then display one minute and fifty-one seconds of news time. After 10 seconds of no activity a sponsored ad may come up in a location on the screen.

In another example a restaurant is chosen when a microphone on the mobile device detects the name of the restaurant by voice, or by touching icon. In some embodiments an audio cue happens with blue ripples to indicate an active item is selected on the screen. A user may change the search item, searched location or searched brand by touching the blue mic.

In an example, an overview map may be shown to give some sense of proximity. The overview may show a current location and pin of desired location. In some embodiments an audio voice may play announcing the distance from the location, for example "you are 0.5 miles from this location."

In an example blue ripples 214 may be shown around a selected restaurant icon to show what is selected. An audio may be played indicating a sound associated with the blue ripples. The sound and blue ripples 214 may indicate something is active.

Additional visual, color and audio cues may assist a user in selecting and navigating to a retail location or other business in the results of a search.

In some embodiments icons 160 have a color or glow 210 to indicate information on the top and on the bottom. In some embodiments the color on the top indicates a type of offer, for example favorite=lime green, special=orange, sponsored=blue, %off=red, price reduction=yellow, and 2 for 1 deals=purple. In some embodiments a glow at the top may indicate a deal associated with the brand or location represented by the icon.

In some embodiments the bottom color indicates proximity to a user. For example: 0.25 miles=green, 0.5 miles=green, 1 miles=green, 1.5 miles=yellow, 2.0 miles=yellow, 2.5 miles=yellow, 2.5.-5 miles=red, and 5 miles and beyond is no color. In some embodiments the user can set their own colors.

In some embodiments icons representing store locations are shown on screen as the result of a query which may be based on: user preference, proximity, and sponsored deal, in that order. By displaying user search results based on user preferences, a user may find preferred search results faster. For example, if a user sets a user preference, with three different brands of restaurants selected as preferred, then the user may perform a single search for restaurants and have results displayed that may make it easier to find one or more location for the preferred restaurant brands. This saves the user time rather than performing three different searches, and comparing the results of the three searches manually. In some embodiments the displayed results may provide the benefit of quickly displaying multiple preferred brands, and allowing for a quick comparison of proximity to the user, for example, based on a color displayed on a portion of an icon associated with the brand and location. The displayed results may provide the benefit of displaying an offer or deal associated with one or more of the search results, thereby allowing a user to quickly assess deals available within their search results.

In FIG. 18A, an example is provided wherein the display device interacts with the user in accepting input and displaying output. The screen displays a group of default or alternatively previously stored user preference selections such as "brand", "item", "near me" etc. FIG. 18B provides more detailed information about each of the selections displayed in FIG. 18A. A user may press or say the options of "near me"; "brand item"; "going to"; "premium"; or "deals" including "favorite deals", "special deals" and "sponsored deals". When a user selects "near me" they may be given a choice of what is near their location, which may be a default screen with logos of pre-selected brands that are close by proximity. When a user selects "brand item" they may be directed to a screen to seek for a brand or item. When a user selects "premium" they may be shown pre-selected choices. When a user selects "deals" they may be shown favorite, special, or sponsored deals. In FIG. 18C, the preselected favorites, in one embodiment, can be retrieved or identified while other selections can still be available to the user and displayed for maximum flexibility. In some embodiments "favorites" stays up so another choice can be made by selecting the favorites button. FIG. 18D then displays selections using an icon. A variety of special effects, such as a glowing icon, mixed with one or more colors or other such effects can be used to grab the attention of the user and visually provide a variety of information very quickly.

As illustrated in FIGS. 18E and F, users can select displayed icons through voice or another user input such as stylus, keyboard or even by hovering a finger above the display device. FIG. 18E may represent a "command page" for the command "near me". In some embodiments a user may hold (touch) the application icon for two seconds to start the voice application, or touch a microphone image on the side of the screen. When the voice application is touched, "airwaves" may animate as blue rippling circles around the voice application button. The button may also have animation such as red "Vs". When the voice application is activated, an audio cue may happen, or be played. FIG. 18F may represent a first part of a prompt screen (1) for the command page—near me.

FIG. 18G may represent a second part of a prompt screen (1a) for the command page—near me. FIG. 18G illustrates how further output can be provided to the user via audio (and input can also be provided the same way by the user.) In some embodiments blue ripples or circles 214 may be shown around an area that is elected, and an audio cue may happen. The audio cue may state the options on the selected item.

FIG. 18H may represent a first proximity screen (2) for the command page—near me, and may be the next step after the prompt screen (1a). FIG. 18H shows how other selections can be made by rolling the display up or down. In some embodiments selected locations and other selections slide up from the bottom of the screen with opacity at 100% at the top and 50% at the bottom until all are in place, then each is at 100%. An audio or sound may be played to indicate the movement of the icon from the bottom to the top.

FIGS. 18I through K show the display as different selections are provided and made. FIG. 18I may represent a second proximity screen (3) for the command page—near me, that may be sequentially after the first proximity screen (2) from FIG. 18H. The second proximity screen may be based on 1—user preference, 2—proximity, and 3—sponsored deal in that order. For example, icons with a user preference and close proximity and a sponsored deal associated may be in a more prominent part of the display, such as the top of the display. Icons with other combinations of user preferences, proximity and sponsored deals may be displayed less prominently. A video player 208, such as a sponsored ad/revolving ads with news feed may be shown, and may activate after ten seconds of no activity. In some embodiments the video player 208 may show a sponsored ad and news. For example the sponsored ad may be nine seconds and then one minute and fifty-one seconds of a news feed, which would then repeat with another nine second ad and another news feed and so forth.

FIG. 18J may represent a third proximity screen (4) for the command page—near me. An icon representing a brand, such as branded icon 212 representing branded restaurant may be chosen by voice command or by touching the branded icon 212. Blue ripples or circles 214 may animate behind the icon to indicate that the branded icon 212 is selected, and an audio cue may play. The audio cue may be a voice that is heard to say the name of the associated brand. A user may touch the voice command 190 button shown as a microphone to change the search item location or brand.

FIG. 18K may represent a first searching screen (5) for the command page—near me. In some embodiments ripples or circles 214 around a selected icon 160 representing a brand such as branded icon 212 may show that the branded icon 212 is selected. An audio file may be played of a sound associated with the ripples or circles 214 to indicate that something is active. A voice may also be played so that a user hears a voice say: searching for branded store. A user may change the search item location or brand by touching the voice command 190, or by touching an item on the navigation menu 216. A user may swipe the screen left to navigate back to the previous screen, which may be the third proximity screen (4) as shown in FIG. 18J.

FIG. 18L may represent a second searching screen (6) for the command page—near me. In this step an overview map 218 may give some sense of proximity and show current location and pin of a desired location. The screen may visually display ripples or circles 214 that may continue until a further option is selected or spoken by the user such as "directions", "call" or "website". FIG. 18L displays how further information is provided, such as an address 232 for each store location. A voice may be played that says "brand store—you are 0.5 miles from this location". FIG. 18M may represent a first directions screen (7) for the command page—near me.

FIG. 18M provides for one embodiment where the address can then be requested to be pinned or map or driving directions are provided for the selected destination. To ensure that the selection was made correctly, security options can be placed such as shown in FIGS. 18M, 18P, 18Q and 18R where special visual effect, in this case an orange blinking glow 234, can be provided to verify the authenticity of selection. The screen may visually show ripples or circles 214 around the selected object until directions are present. A user may also touch the phone or say "directions" and then a voice may be played that says to the user "directions to branded store". An audio cue may be used with a specified sound to alert the user to their directions choice.

FIG. 18N may represent a second directions screen (8) for the command page—near me. This screen may be displayed after a user touches the steering wheel 236 image from FIG. 18M for directions. The screen in FIG. 18N may show a turn by turn directions button 238 and a mute button 228. Map and voice directions may be activated in real time. The screen may visually display ripples or circles 214 until directions are present. A user may tap on the overview map 218 to go to a full screen view of the map. In some embodiments a voice may be played to the user saying "let's go". Then audio may be played with directions. In some embodiments a user may ask for turn by turn directions, or use GPS location for navigation.

FIG. 18O may represent a third directions screen (9) for the command page—near me. A full screen map 230 may be shown, and a voice may be played for the user to hear saying "full screen" to let the user know their choice. A voice may be played to give turn by turn directions like a standard GPS. FIGS. 18P through T provide for other choices and selection about the categories including seeing the map and driving directions and even being redirected to a store or company website.

FIG. 18P may represent a first call screen (10) for the command page—near me. A user may touch the phone or say "call", and then a voice may be played for the user that says "calling to brand store". The screen may visually display ripples or circles 214 until the calling screen is present. A voice may be played stating that the phone number is being called. In some embodiments an orange blinking glow 234 around a phone button 240 may let the user know their choice before going to the second call screen (11) (FIG. 18Q). In some embodiments the phone number may be displayed. A color glow 242 may indicate distance from the user's current location.

FIG. 81Q may represent a second call screen (11) for the command page—near me. A voice may be played and heard by the user that says: "calling branded store". As shown in the example embodiments of FIGS. 18A-U a favorites button 244 may stay up so another choice can be made.

FIG. 18R may represent a first website page (12) for the command page—near me. A user may touch the website button 246 or say "website" and then a voice may be played that says to the user "website to branded store". Ripples or circles 214 may be displayed visually and may continue until the second website screen (13) is present (as shown in FIG. 18S). In some embodiments an orange blinking glow 234 may let the user know their choice before going to the second website screen (13). FIG. 18S may represent a second website screen (13) for the command page—near me. In this example embodiment the branded store website home page 248 may be displayed. Any deals 250 associated with the website 248 may be displayed. A voice may be played for the user that says "branded store website". In some embodiments a user may touch the portion of the screen displaying the web site graphic to fill the screen or may say "enlarge site".

FIG. 18T may represent a third website screen (14) for the command page—near me. In this example embodiment a video player 208 may have a play button 252 with an outline 254, and the outline 254 may have a color that varies based on a rating of the video. In some embodiments the video player 208 may appear with a sponsored video commercial after five seconds. In some embodiments a user may rotate the device for full screen video, or may hit the play arrow on the video to cancel the third website screen (14) and go to the video screen (15) shown in FIG. 18U.

FIG. 18U may represent a video screen (15) for the command page—near me. The video screen (15) may be a full screen video player with a play button 252 for one or more videos, and an outline 254 with a color that is based on ratings. The system represented in FIG. 18U may enable the user to make selections by presenting the user with a rating system. For example, picking among one or many hotels in a city, the user can see if a particular selection is rated high by using a certain criteria. In one embodiment, this can be accomplished by the system or previous user selections or by communicating with other default or user selected sites such as Tripadvisor®.

Example 4

In some embodiments images or icons may be larger to assist visually impaired users. The example illustrations show multiple icons or choices on a screen, in some embodiments, however, fewer icons or only one icon may be displayed. In some embodiments the program may play a voice whenever an option is touched on the touch screen. For example the mobile device may play a voice that says a brand name, store name, or provide directions. In some embodiments a sound may be played when a specific function or image on a touchscreen is touched.

The mobile device may vibrate when it is touched, with a different vibration pattern for different functions. For example a first vibration pattern can be used for a first type of deal, and a second vibration pattern can be used for a second type of deal, and a third type of vibration pattern can be used to indicate a location distance. A different vibration pattern can include duration of the vibration, frequency of the vibration, intensity of the vibration, and pauses between vibrations.

Example 5

In some embodiments the location may be the location in a city where a user plans to travel. A mobile device may be programmed to accept and store multiple locations and a user may select between the multiple locations to find information about deals, offers and establishments near one of the multiple locations. A location may be a specific address, or a city or area.

In some embodiments information may be entered related to a trip that a user plans to take. For example, a user may enter a city where they plan to travel, and may be shown flight information for air-travel to and from that city, as well as hotel information and deals in that city, including the location of hotels or brands of hotels that are saved as favorites, and information related to restaurants close to the hotel information. In some embodiments when a user has reserved an airline flight, or a hotel, the reservation information may be entered or imported to be saved and used as a starting location for searches for additional locations. In some embodiments a mobile device programmed in accordance with some embodiments may be useful as a trip planner and trip itinerary that may allow a user to choose restaurants and other locations, or save multiple locations as favorites prior to traveling to the city. In some embodiments a user may create city profiles and locate brands/businesses specific to a specific location such as a zip code or a city.

Enhanced Search Results

Figure 21:
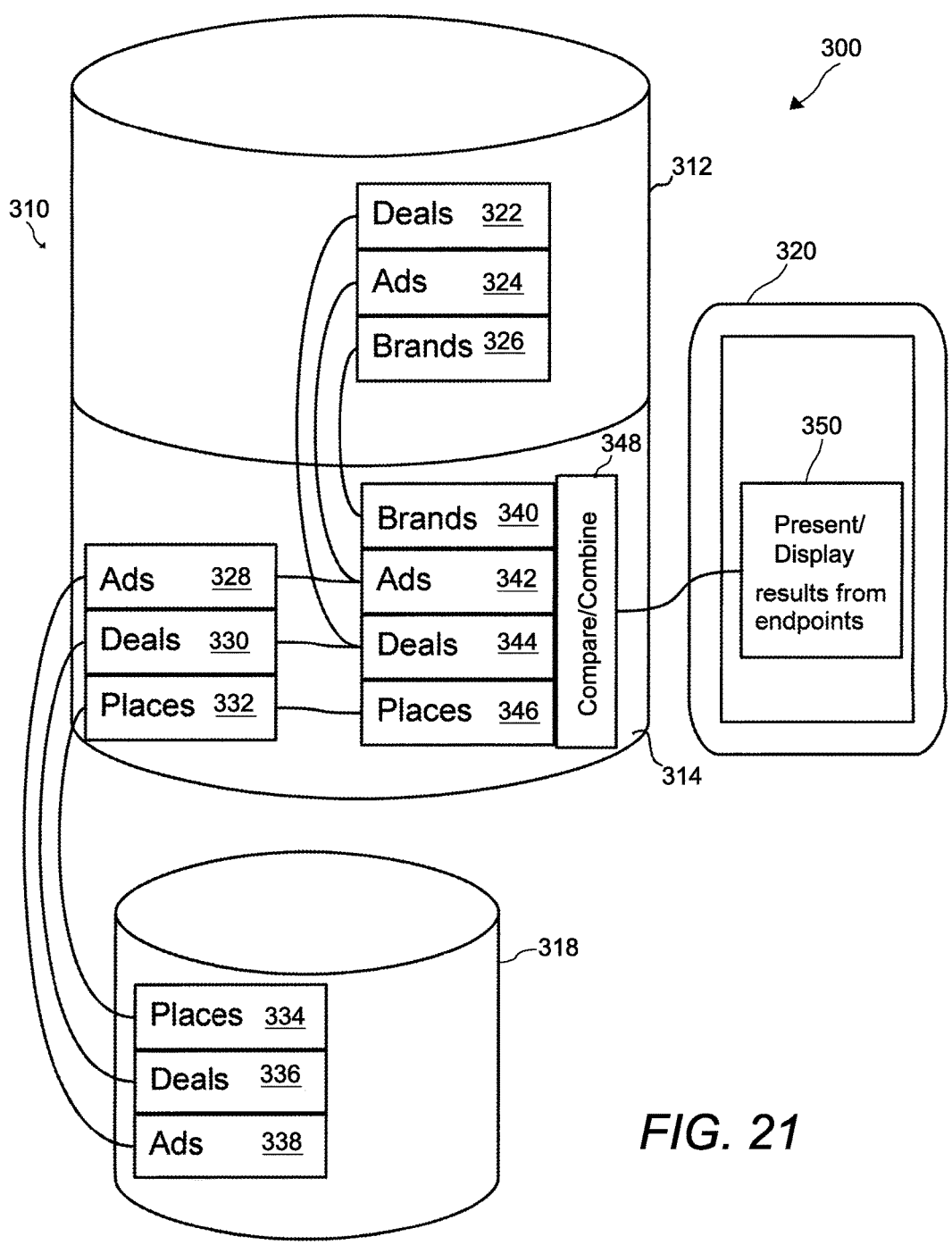
FIG. 21 is an example system for delivering information to a mobile device.

FIG. 21 shows an example data system 300 with a content server 310 communicatively connected to a mobile communication device 320 according to some embodiments. The content server 310 may be communicatively connected to a second server 318. The content server may have a content management system—CMS 312 including CMS deals 322, CMS advertisements 324, and brand information 326.

The content server 310 may include an application program interface (API) 314. API 314 may receive, filter and enhance information based on a preference based search query from a mobile communication device 320. API 314 may include multiple endpoints, including brands endpoint 340, advertisements endpoint 342, deals endpoint 344 and places endpoint 346. In some embodiments results from one or more endpoints are sent directly to mobile communication device 320, and are combined by a processor on the mobile communication device 320 to display results 350 from the endpoints. API may send and receive information from other servers including second server 318 based on the preference based search query from the mobile communication device 320. In some embodiments second server may have a second places endpoint 334, a second deals endpoint 336 and a second advertisement endpoint 338. Information from the second endpoints 334, 336 and 338 may be received and filtered based on the preference based search query to produce filtered advertisement information 328, filtered deal information 330 and filtered places information 332.

The CMS deals 322 may include information including coupon images, links to brand information 326, vendor location information, terms related to the deal, key words and other information related to a deal or offering. In some embodiments when a query has a match to one or more pieces of information in the CMS deals 322, the deal or deals that match may be filtered based on locations where the deals are offered.

The CMS advertisements 324 may include advertisement information. The advertisement information may include sale item terms, key words, location information, advertisement images, advertisement text, advertisement video, or other information related to one or more advertisements. The system may match query information to advertisement information to send location information and other information in a response to the query.

The brands information 326 may include details related to brands, which may include logos, images, keywords, locations, website links, or other information related to a brand.

The CMS deal information 322, CMS advertisement information 324, and brand information 326 may be used by the API 314 to respond to queries from the mobile communication device 320. The API 314 may provide information or details, for example logos, for at least some of the brands that are displayed on the mobile communication device 320. In some embodiments when a query matches a brand, and a location of a store with that brand, then the API 314 sends an image of the brand's logo in response to a query through the brand endpoint 340. If an image of the brand logo is not available, the mobile communication device 320 may display the name of the brand instead of the logo of the brand.

The API 314 may provide information or details for locations displayed on the mobile communication device 320. The API 314 may provide GPS latitude and longitude information, street address information, images of the location, directions to the location, or links to other services or programs that provide location or direction information, such as a map or navigation program or website.

The API 314 may provide deal information or details including deal items, including locations where deals are offered, expiration date of deals, images related to deals or links to websites offering deals or other information.

In some embodiments a content server 310 may include a database of information and instructions capable of receiving a query for a location based search, and returning a response to the query with multiple matches.

In some embodiments when a user searches for a place, or location, the user may enter a search term (for example "pizza"), or request nearby places without a search term. The mobile communication device 320 may send a query with any keywords entered to the places endpoint 346 with a present location including GPS latitude and longitude information, and the content server 310 may receive the query. A query may be sent from API 314 to a second server 318 with second endpoints. In this example with a search for a place, the API 314 may send a query to second places endpoint 334, which may return multiple matches. The multiple matches may be filtered by a filter based on user preferences or system settings to result in filtered places information 332. The filtered results may then be augmented by comparing against the brand information 326, and correlating brand information 326 with the filtered places information 332. The places endpoint 346 may then respond to the mobile communication device 320 with the filtered matches augmented with the brand information correlated to those matches. The mobile communication device 320 may then use the filtered matches and send a request to the deals endpoint 344 to determine if the matches also have deals. The result 350 may then be displayed or presented to the user. In some embodiments the augmented information of providing brands and deals may save a user time and effort in performing searching.

In some embodiments CMS deal information 322 may be considered sponsored deals or first deals. First deals may be linked to a brand as a whole, or one or more specific locations. In some embodiments the deals endpoint 344 may work in conjunction with the second server 318 and a second deals endpoint 336 to deliver deal results that may be second deals.

A user may enter a search request for deal information into the mobile communication device 320. The mobile communication device 320 may send a query with GPS latitude and longitude information, and the content server 310 may receive the query. API 314 may send a query to second deals endpoint and receive multiple deal matches based on the query. The multiple deal matches may be filtered by API 314 based on user preferences or system settings to produce filtered deal information 330. User preferences may be sent with the query from the mobile communication device 320 and may include preferences for types of places. In some embodiments types of places include restaurants, specific types of restaurants, retail stores, specific types of retail stores, and other types of commercial establishments. API 314 may also query content management system—CMS 312, and CMS deal information 322 to determine matches, and may filter the matches based on user preference or system settings. Filtered matched deals may be correlated to brands and brand information 326. The deals endpoint 344 may return the filtered deal information augmented with brand information to the mobile communication device 320. The mobile communication device 320 may receive the response to the query from deals endpoint 344 and match results against places based on place identification or brand identification. The mobile communication device 320 may present or display the results with visuals such as icons updated with glows based on the deal type.

In some embodiments brand identification may be combined with other information on the mobile device, with an automatic query based on matches to the brands endpoint. The brands endpoint may return brand information 326 based on the search so that logos or other brand information may be combined with other results to augment the search results. In some embodiments the brand information related to a search query is compared/combined 348 with search results on the content server 310.

The query may include global positioning system (GPS) information from the mobile communication device 320 including a present location of the mobile communication device 320. GPS information may include a destination location of the mobile communication device 320, where the user of the mobile communication device 320 intends to travel.

In some embodiments the response to a preference based search query includes information from the content server. In some embodiments the response to the preference based search query includes information from multiple servers.

In some embodiments the system 300 compares a first GPS data point and a second GPS data point to determine a direction of travel. The first GPS data point may be from a present location, or from a recent past location where GPS information was received or calculated. The second GPS data point may be from the present location, or from a desired location where the user is traveling to or intends to travel. The system 300 may compare the first GPS data point and the second GPS data point and determine a direction of travel. The system 300 may filter query result matches and tag or exclude matches from the query that are not within the direction of travel. In some embodiments the system 300 determines whether a result or query match is within a direction of travel by comparing a first distance between the present location of the mobile device and a destination location, with a second distance between the query match location and the destination location. If the second distance is less than the first distance, or if the second distance is not greater than the first distance plus an acceptable deviation distance, then the system may determine that the query match is within the direction of travel. In some embodiments the destination location may be a calculated destination location, which may be calculated by comparing a first recorded GPS data point and a second recorded GPS data point to project a line that includes the first recorded GPS data point and the second recorded GPS data point, and the calculated destination location may be a point along the line at a set distance from the present location.

In some embodiments the current direction of travel may be determined based on more than two prior GPS data points, and a line representing the calculated direction of travel may include some or none of the data points. In other embodiments a processor may determine that the user is traveling on a specific roadway, and the direction of travel may be defined by the roadway in one direction on the roadway. By excluding search results that are not in the user's direction of travel, the user's experience may be improved, because results that are less convenient may not be displayed. Excluding search results outside of the user's direction of travel may also allow the user to see more choices that are convenient to the user. In some embodiments a processor on the mobile device may exclude search results that are not in a direction of travel after search results are received. In some embodiments a processor on a server may exclude search results based on a direction of travel before the search results are sent to the mobile device. If search results are excluded prior to sending results to the mobile device, less data may need to be sent to the mobile device, which may result in faster response time for responses to queries.

Figure 22:
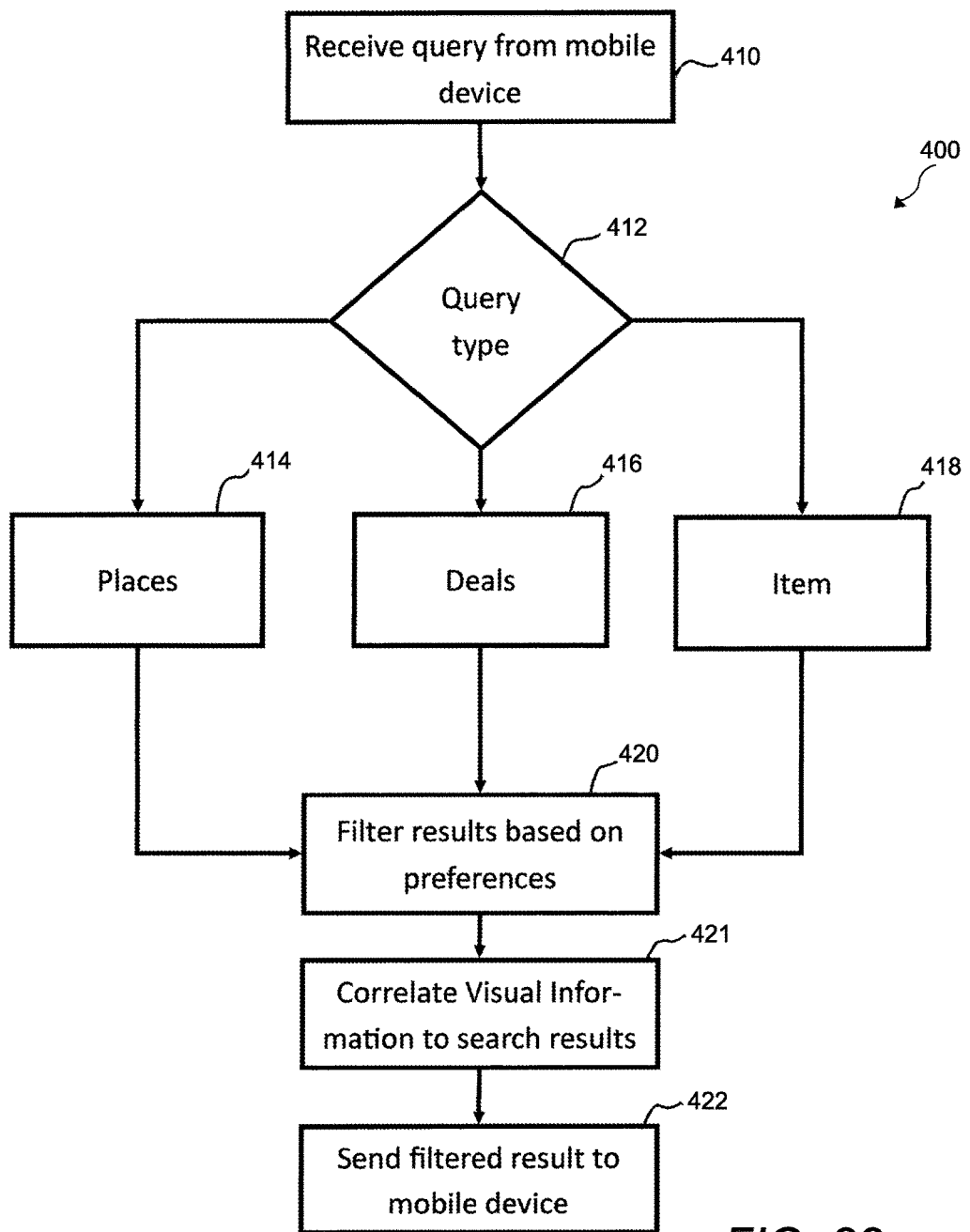
FIG. 22 is a flow diagram of a method according to some embodiments.

FIG. 22 shows a method according to some embodiments. A method of enhancing context information 400 in a search result may include the step of receiving a preference based search query from a mobile device 410. In some embodiments preferences may be included in the search query. A search query may be directed to searching for a place, a deal, or an item. In some embodiments a search query may be directed to searching for other types of searches. In example embodiments according to FIG. 22 queries may be directed to a places endpoint, or a deals endpoint, or an item endpoint. In some embodiments the query type 412 may be included as part of the query, so that the query is automatically directed to the correct endpoint. When a query is directed to the places endpoint, then places 414 with locations and information regarding the places may be part or all of the result returned. When a query is directed to the deals endpoint, then deals 416 with locations and information regarding where deals are offered and can be purchased, may be part or all of the result returned. When a query is directed to the item endpoint, then items 418 with location information where the items may be purchased may be returned as part or all of the search query. A search query may be filtered based on preferences 420.

In some embodiments the results of a search query may be enhanced or augmented with visual information. The method 400 may include correlating visual information to search results 421. Visual information may include images such as brand logos, deal information such as sale information images, graphics or other information to be displayed primarily visually rather than primarily in text. Visual information may include distance ranges to be displayed with a color, or an indicator or marker correlated to an available deal with a specific search result, where the indicator is communicated through visual information. Various embodiments disclosed in this application are examples of visual information. The method 400 may include the step of sending filtered results to the mobile device 422.

In some embodiments the mobile device may automatically perform a query based on the results received from a first query. A first query, for example may be for places, and multiple places may be returned based on the places query. The mobile device may then automatically send a second search query for deals based on the search results from the first query. The mobile device may combine the results of the first query with the results of the second query by correlating deals with places, and displaying or presenting the results of the combined query. Displayed or presented search results may indicate if there are places or items searched for that are locally available, and may indicate if one or more of the locations has a deal available.

Use of the term "or" in this application is intended to be inclusive and not exclusive, so that "or" includes "and." When "or" is used between two items, this indicates that one or both of the items may be included, and does not mean that only one of the two items can be included to the exclusion of the other item.

Those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention. These and other constructions will become obvious to those skilled in the art from the above drawings and detailed description of the preferred embodiments in combination with the claims.

What is claimed is:

1. A computer-implemented method for providing enhanced context information on a mobile communication device, said mobile communication device being communicatively connected to a content server, the method comprising:
    receiving, by the content server, a preference based text search query; determining, by the content server, text based search results based on the preference based text search query;
    correlating, by the content server, instructions to add a glow with at least one of a color or a pattern to at least a portion of the text based search results; and
    transmitting to the mobile communication device, by the content server, a response to the preference based text search query with multiple matches, wherein at least one of the multiple matches are tagged as preferred based on one or more user brand preferences, wherein the response includes location information correlated to at least a portion of the multiple matches;
    wherein the response includes the instructions to add the glow with at least one of the color or the pattern correlated to one or more of the multiple matches, to enable a user to view the glow on the mobile communication device as an indication of the portion of the text based search results;
    wherein the response includes deal information correlated with one or more of the multiple matches of the preference based text search query, and wherein the instructions to add the glow with at least one of the color or the pattern includes correlation of the glow with the deal information;
wherein the deal information includes first deals stored in the content server and second deals received from a second server; and
wherein the second deals are associated with a location.

2. The computer-implemented method according to claim 1, wherein the preference based text search query includes a present location of the mobile communication device, the method further comprising:
correlating, by the content server, the location information with the instructions to add the glow with at least one of the color or the pattern.

3. The computer-implemented method according to claim 2, the method further comprising:
transmitting to the mobile communication device, by the content server, an updated response to the preference based text search query, wherein the updated response is based on an updated present location of the mobile communication device, and wherein the updated response includes updated instructions to add updated glow with an updated color or an updated pattern, and wherein the updated glow includes correlation to the updated present location of the mobile communication device.

4. The computer-implemented method according to claim 1, wherein the preference based text search query includes a present location of the mobile communication device, the method further comprising:
transmitting to the mobile communication device, by the content server, an updated response to the preference based text search query, wherein the updated response is based on an updated present location of the mobile communication device, wherein the updated response includes updated second deals.

5. The computer-implemented method according to claim 1, wherein the response includes advertisement information correlated with the multiple matches, and wherein the instructions to add the glow with at least one of the color or the pattern includes correlation of the glow to the advertisement information.

6. The computer-implemented method according to claim 1, wherein the response includes brand information that is correlated to one or more of the multiple matches.

7. The computer-implemented method according to claim 1, wherein the preference based text search query includes a distance radius, and wherein the multiple matches that are tagged as preferred are within the distance radius.

8. The computer-implemented method according to claim 7, wherein the preference based text search query includes a direction of travel, and wherein the multiple matches are within a deviation from the direction of travel, wherein the deviation is between about fifteen degrees and ninety degrees from the direction of travel.

9. The computer-implemented method according to claim 8, wherein the deviation is about forty-five degrees.

10. The computer-implemented method according to claim 1 wherein the instructions to add the glow with at least one of the color or the pattern includes brand images correlated with the multiple matches.

11. The computer-implemented method according to claim 1 wherein the instructions to add the glow with at least one of the color or the pattern includes offer status correlated with the multiple matches.

12. The computer-implemented method according to claim 1 wherein the instructions to add the glow with at least one of the color or the pattern includes instructions for light to emanate from an icon in one of multiple colors.

* * * * *